United States Patent
Backman

(10) Patent No.: US 10,019,062 B2
(45) Date of Patent: Jul. 10, 2018

(54) DISPLAY APPARATUS PROVIDING TACTILE FUNCTIONALITY

(75) Inventor: Juha Reinhold Backman, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/417,438

(22) PCT Filed: Aug. 10, 2012

(86) PCT No.: PCT/IB2012/054094
§ 371 (c)(1),
(2), (4) Date: Jul. 26, 2015

(87) PCT Pub. No.: WO2014/024011
PCT Pub. Date: Feb. 13, 2014

(65) Prior Publication Data
US 2015/0370328 A1    Dec. 24, 2015

(51) Int. Cl.
| | |
|---|---|
| *G06F 3/01* | (2006.01) |
| *G06F 3/041* | (2006.01) |
| *G06F 3/038* | (2013.01) |
| *G06F 3/0354* | (2013.01) |

(52) U.S. Cl.
CPC .............. *G06F 3/016* (2013.01); *G06F 3/038* (2013.01); *G06F 3/03547* (2013.01); *G06F 3/041* (2013.01); *G06F 2203/04105* (2013.01)

(58) Field of Classification Search
CPC ...... G06F 3/038; G06F 3/041; G06F 3/03547; G06F 3/016; G06F 2203/04105
See application file for complete search history.

(56) References Cited

U.S. PATENT DOCUMENTS

| | | | |
|---|---|---|---|
| 2004/0160421 A1* | 8/2004 | Sullivan ................. | G06F 3/0436 345/173 |
| 2007/0243835 A1* | 10/2007 | Zhu ....................... | H04B 1/3833 455/90.2 |
| 2009/0002328 A1 | 1/2009 | Ullrich et al. | |
| 2009/0021354 A1 | 1/2009 | Furusho | |

(Continued)

FOREIGN PATENT DOCUMENTS

| | | |
|---|---|---|
| EP | 2194697 A1 | 6/2010 |
| WO | 2009/085060 A1 | 7/2009 |
| WO | 2013/070591 A1 | 5/2013 |

OTHER PUBLICATIONS

International Search Report and Written Opinion received for corresponding Patent Cooperation Treaty Application No. PCT/IB2012/054094, dated Jun. 17, 2013, 13 pages.

(Continued)

*Primary Examiner* — Abhishek Sarma
(74) *Attorney, Agent, or Firm* — Harrington & Smith

(57) ABSTRACT

An apparatus comprising: at least two actuators configured to provide a force to move a display assembly component at least at two separate locations of the display assembly component such that at least one of the at least two separate locations of the display assembly component has a displacement based on at least one actuation input; at least one sensor configured to determine the displacement of the display assembly component, wherein the sensor is configured to provide a feedback signal; and a control unit configured to control at least one of the at least two actuators based on the at least one actuation input to the control unit and the feedback signal.

20 Claims, 16 Drawing Sheets

(56) References Cited

U.S. PATENT DOCUMENTS

| | | |
|---|---|---|
| 2009/0167704 A1 | 7/2009 | Terlizzi et al. |
| 2010/0156824 A1 | 6/2010 | Paleczny et al. |
| 2011/0012717 A1 | 1/2011 | Pance et al. |
| 2011/0043477 A1 | 2/2011 | Park et al. |
| 2011/0260990 A1 | 10/2011 | Ali et al. |

OTHER PUBLICATIONS

Hoggan et al., "Mobile Multi-Actuator Tactile Displays", Proceedings of the 2nd international conference on Haptic and audio interaction design, 2007, 12 pages.

Extended European Search Report received for corresponding European Patent Application No. 12882604.7, dated Mar. 9, 2016, 11 pages.

\* cited by examiner

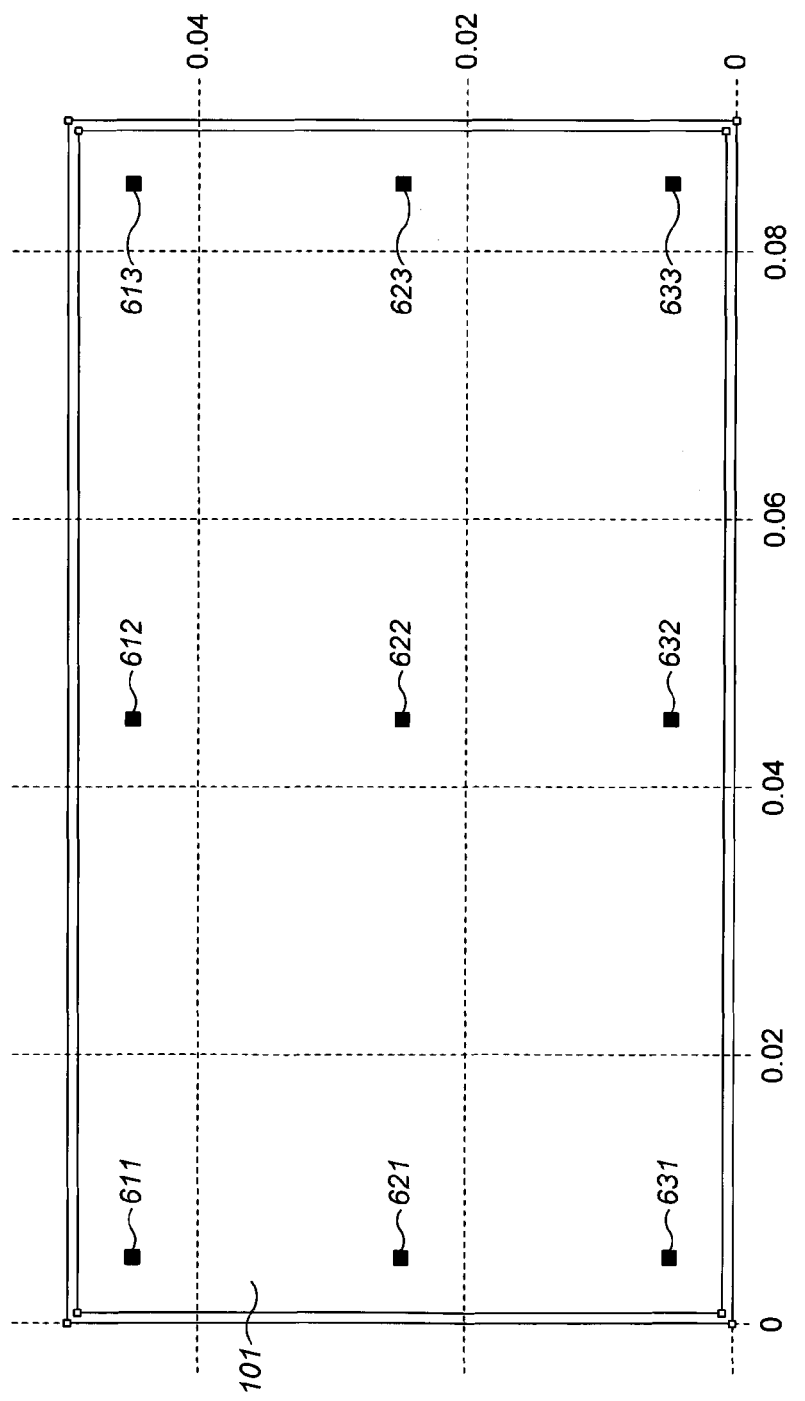

Center 100 Hz with control (top) and without control (bottom)

Center 250 Hz with control (top) and without control (bottom)

Center 500 Hz with control (top) and without control (bottom); note the phase inversion due to diaphragm resonance in the non-controlled case Center 1000 Hz with control (top) and without control (bottom)

Center 2000 Hz with control (top) and without control (bottom); this example illustrates that although the control has an influence over the vibrational patterns even at high frequencies, actual control of vibration becomes impossible once the wavelength of the bending wave is shorter than the distance between the control points.

Corner 100 Hz with control (top) and without control (bottom)

Corner 250 Hz with control (top) and without control (bottom)

Corner 500 Hz with control (top) and without control (bottom)

Corner 1000 Hz with control (top) and without control (bottom)

Corner 2000 Hz with control (top) and without control (bottom)

DISPLAY APPARATUS PROVIDING TACTILE FUNCTIONALITY

RELATED APPLICATION

The application was originally filed as PCT Application No. PCT/IB2012/054094 filed Aug. 10, 2012.

FIELD

The present invention relates to a providing tactile functionality. The invention further relates to, but is not limited to, display apparatus providing tactile functionality for use in mobile devices.

BACKGROUND

Many portable devices, for example mobile telephones, are equipped with a display such as a glass or plastic display window for providing information to the user. Furthermore such display windows are now commonly used as touch sensitive inputs. In some cases the apparatus can provide a visual feedback and audible feedback when recording a touch input. In some further devices the audible feedback is augmented with a vibrating motor used to provide a haptic feedback so the user knows that the device has accepted the input.

The panels used for tactile feedback or sound generation are vibrated by an actuator. The vibration and modes of vibration are determined by the passive mechanical properties or parameters of the system. For example the rigidity of the panel, the impulse response of the actuator etc and thus the vibrational patterns generated are defined by these mechanical properties.

STATEMENT

According to an aspect, there is provided an apparatus comprising: at least two actuators configured to provide a force to move a display assembly component at least at two separate locations of the display assembly component such that at least one of the least at two separate locations of the display assembly component has a displacement based on at least one actuation input; at least one sensor configured to determine the displacement of the display assembly component, wherein the sensor is configured to provide a feedback signal; and a control unit configured to control at least one of the at least two actuators based on the at least one actuation input to the control unit and the feedback signal.

At least one of the at least two actuators and at least one sensor may be an integrated actuator.

At least one of the at least two actuators may comprise a piezoelectric actuator, and the at least one sensor may comprise a piezoelectric sensor located between the at least one of the at least two piezoelectric actuators and the display assembly component.

The apparatus may further comprise a pad located between at least one of the at least two actuators and the display assembly component and configured to transmit the actuator force to the display assembly component at one of the two locations.

The display assembly component may comprise a display panel.

The control unit may comprise a feedback amplifier circuit, such that the feedback generated by the at least one sensor under load is configured to modify a dynamic characteristic of at least one of the at least two actuators.

The at least one actuation input may be an actuator input signal for a first of the at least two actuators, and the sensor and feedback signal may be associated with a second of the at least two actuators, such that the control unit may be configured to control the second of the at least two actuators to localise substantial motion of the display assembly component in a region defined by the location of the first actuator.

The control unit may comprise an adaptive filter.

The at least one actuation input may comprise an actuator input signal for a first of the at least two actuators, and the sensor and feedback signal may be associated with the first of the at least two actuators, such that the control unit may be configured to control the first of the at least two actuators to compensate for motion of the display assembly component in the region defined by the location of the first actuator caused by motion of the display assembly component by at least one other of the at least two actuators.

According to a second aspect there is provided an apparatus comprising at least one processor and at least one memory including computer code for one or more programs, the at least one memory and the computer code configured to with the at least one processor cause the apparatus to at least perform: generating at least one actuation signal for at least two actuators configured to provide a force to move a display assembly component at least at two separate locations of the display assembly component such that at least one of the least at two separate locations of the display assembly component has a displacement based on the at least one actuation signal; receiving a feedback signal from at least one sensor configured to determine the displacement of the display assembly component; and controlling the at least one of the at least two actuators based on the at least one actuation input and the feedback signal.

The at least one of the at least two actuators and at least one sensor may be an integrated actuator.

At least one of the at least two actuators may comprise a piezoelectric actuator, and the at least one sensor may comprise a piezoelectric sensor located between the at least one of the at least two piezoelectric actuators and the display assembly component.

The apparatus may further comprise a pad located between at least one of the at least two actuators and the display assembly component may be configured to transmit the actuator force to the display assembly component at one of the two locations.

The display assembly component may comprise a display panel.

The at least one actuation input may be an actuator input signal for a first of the at least two actuators, and the sensor and feedback signal may be associated with a second of the at least two actuators, such that controlling the at least one of the at least two actuators based on the at least one actuation input and the feedback signal may cause the apparatus to perform controlling the second of the at least two actuators to localise substantial motion of the display assembly component in a region defined by the location of the first actuator.

The at least one actuation input may comprise an actuator input signal for a first of the at least two actuators, and the sensor and feedback signal may be associated with the first of the at least two actuators, such that controlling the at least one of the at least two actuators based on the at least one actuation input and the feedback signal may cause the apparatus to perform controlling the first of the at least two actuators to compensate for motion of the display assembly component in the region defined by the location of the first actuator caused by motion of the display assembly component by at least one other of the at least two actuators.

According to a third aspect there is provided an apparatus comprising: means for generating at least one actuation signal for at least two actuators configured to provide a force to move a display assembly component at least at two separate locations of the display assembly component such that at least one of the least at two separate locations of the display assembly component has a displacement based on the at least one actuation signal; means for receiving a feedback signal from at least one sensor configured to determine a displacement of the display assembly component; and means for controlling the at least one of the at least two actuators based on the at least one actuation input and the feedback signal.

The at least one of the at least two actuators and at least one sensor may be an integrated actuator.

At least one of the at least two actuators may comprise a piezoelectric actuator, and the at least one sensor may comprise a piezoelectric sensor located between the at least one of the at least two piezoelectric actuators and the display assembly component.

The apparatus may further comprise a pad located between at least one of the at least two actuators and the display assembly component may be configured to transmit the actuator force to the display assembly component at one of the two locations.

The display assembly component may comprise a display panel.

The at least one actuation input may be an actuator input signal for a first of the at least two actuators, and the sensor and feedback signal may be associated with a second of the at least two actuators, such that the means for controlling the at least one of the at least two actuators based on the at least one actuation input and the feedback signal may comprise means for controlling the second of the at least two actuators to localise substantial motion of the display assembly component in a region defined by the location of the first actuator.

The at least one actuation input may comprise an actuator input signal for a first of the at least two actuators, and the sensor and feedback signal may be associated with the first of the at least two actuators, such that the means for controlling the at least one of the at least two actuators based on the at least one actuation input and the feedback signal may comprise means for controlling the first of the at least two actuators to compensate for motion of the display assembly component in the region defined by the location of the first actuator caused by motion of the display assembly component by at least one other of the at least two actuators.

According to a fourth aspect there is provided a method comprising: generating at least one actuation signal for at least two actuators configured to provide a force to move a display assembly component at least at two separate locations of the display assembly component such that at least one of the least at two separate locations of the display assembly component has a displacement based on the at least one actuation signal; receiving a feedback signal from at least one sensor configured to determine the displacement of the display assembly component; and controlling the at least one of the at least two actuators based on the at least one actuation input and the feedback signal.

At least one of the at least two actuators and at least one sensor may be an integrated actuator.

At least one of the at least two actuators may comprise a piezoelectric actuator, and the method may further comprise locating the at least one sensor, comprising a piezoelectric sensor, between the at least one of the at least two piezoelectric actuators and the display assembly component.

The method may comprise locating a pad between at least one of the at least two actuators and the display assembly component may be configured to transmit the actuator force to the display assembly component at one of the two locations.

The display assembly component may comprise a display panel.

The at least one actuation input may be an actuator input signal for a first of the at least two actuators, and the method may further comprise associating the sensor and feedback signal with a second of the at least two actuators, such that controlling the at least one of the at least two actuators based on the at least one actuation input and the feedback signal may comprise controlling the second of the at least two actuators to localise substantial motion of the display assembly component in a region defined by the location of the first actuator.

The at least one actuation input may comprise an actuator input signal for a first of the at least two actuators, and the method may further comprise associating the sensor and feedback signal with the first of the at least two actuators, such that controlling the at least one of the at least two actuators based on the at least one actuation input and the feedback signal may comprise controlling the first of the at least two actuators to compensate for motion of the display assembly component in the region defined by the location of the first actuator caused by motion of the display assembly component by at least one other of the at least two actuators.

A computer program product stored on a medium for causing an apparatus to may perform the method as described herein.

An electronic device may comprise apparatus as described herein.

A chipset may comprise apparatus as described herein.

SUMMARY OF FIGURES

For better understanding of the present invention, reference will now be made by way of example to the accompanying drawings in which:

FIG. 7 shows schematically an example tactile effect control system actuator grid according to some embodiments;

DESCRIPTION OF EXAMPLE EMBODIMENTS

The application embodiments described herein are apparatus and methods for overcoming the problem of producing localised vibrations in display panels suitable for both haptic and audio applications. Localised haptic signal generation for example would enable precise interaction where two or more fingers are used on the display. Furthermore area or regional vibration for audio generation would improve the privacy and echo suppression where the panel is used as an earpiece and further control the frequency response output otherwise.

Although active vibration control is known, they are typically intended for controlling an entire system vibration. There have been experimental localised haptic systems. For example some localised proposals have used very flexible or rubberlike surfaces such that the vibration it heavily attenuated away from the actuation, however such surfaces are then ill suited for generating wideband audio applications. Furthermore some proposals to the localised signal generation issue is to physically divide (or isolate) the surface into areas. However the division of the panel can be difficult or not practical to implement in the sections where the surface is used for display purposes. Furthermore even where the physical divisions are allowed there can be some vibration transmitted across elements connecting the subsections.

Thus the concept of the embodiments described herein can be implemented by a vibrating surface or panel such as a tactical audio display which can be configured to be driven by multiple actuators. These multiple actuators can be configured such that at least one of the actuators is providing the driving signal creating the designed vibration pattern whereas the other actuators can be driven with feedback or feedforward correction systems designed to minimise the movement at their attachment points.

Figure 1:
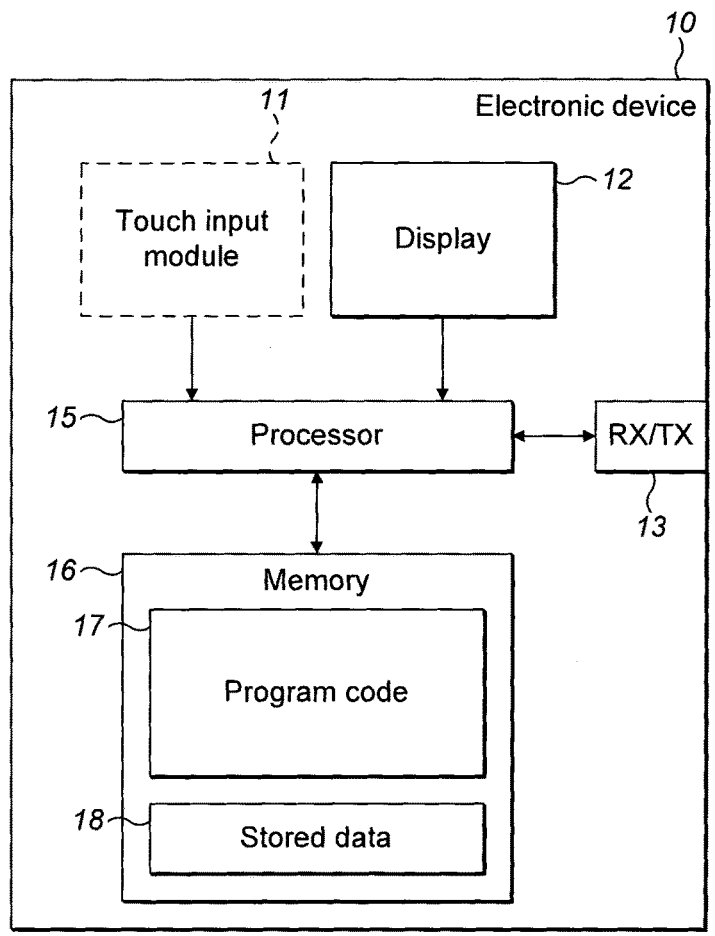
FIG. 1 shows schematically an apparatus suitable for employing some embodiments.

With respect to FIG. 1 a schematic block diagram of an example electronic device 10 or apparatus on which embodiments of the application can be implemented. The apparatus 10 is such embodiments configured to provide improved tactile and acoustic wave generation.

The apparatus 10 is in some embodiments a mobile terminal, mobile phone or user equipment for operation in a wireless communication system. In other embodiments, the apparatus is any suitable electronic device configured to provide an image display, such as for example a digital camera, a portable audio player (mp3 player), a portable video player (mp4 player). In other embodiments the apparatus can be any suitable electronic device with touch interface (which may or may not display information) such as a touch-screen or touch-pad configured to provide feedback when the touch-screen or touch-pad is touched. For example in some embodiments the touch-pad can be a touch-sensitive keypad which can in some embodiments have no markings on it and in other embodiments have physical markings or designations on the front window. The user can in such embodiments be notified of where to touch by a physical identifier—such as a raised profile, or a printed layer which can be illuminated by a light guide.

The apparatus 10 comprises a touch input module or user interface 11, which is linked to a processor 15. The processor 15 is further linked to a display 12. The processor 15 is further linked to a transceiver (TX/RX) 13 and to a memory 16.

In some embodiments, the touch input module 11 and/or the display 12 are separate or separable from the electronic device and the processor receives signals from the touch input module 11 and/or transmits and signals to the display 12 via the transceiver 13 or another suitable interface. Furthermore in some embodiments the touch input module 11 and display 12 are parts of the same component. In such embodiments the touch interface module 11 and display 12 can be referred to as the display part or touch display part.

The processor 15 can in some embodiments be configured to execute various program codes. The implemented program codes, in some embodiments can comprise such routines as touch processing, input simulation, or tactile effect simulation code where the touch input module inputs are detected and processed, effect feedback signal generation where electrical signals are generated which when passed to a transducer can generate tactile or haptic feedback to the user of the apparatus, or actuator processing configured to generate an actuator signal for driving an actuator. The implemented program codes can in some embodiments be stored for example in the memory 16 and specifically within a program code section 17 of the memory 16 for retrieval by the processor 15 whenever needed. The memory 15 in some embodiments can further provide a section 18 for storing data, for example data that has been processed in accordance with the application, for example pseudo-audio signal data.

The touch input module 11 can in some embodiments implement any suitable touch screen interface technology. For example in some embodiments the touch screen interface can comprise a capacitive sensor configured to be sensitive to the presence of a finger above or on the touch screen interface. The capacitive sensor can comprise an insulator (for example glass or plastic), coated with a transparent conductor (for example indium tin oxide—ITO). As the human body is also a conductor, touching the surface of the screen results in a distortion of the local electrostatic field, measurable as a change in capacitance. Any suitable technology may be used to determine the location of the touch. The location can be passed to the processor which may calculate how the user's touch relates to the device. The insulator protects the conductive layer from dirt, dust or residue from the finger.

In some other embodiments the touch input module can be a resistive sensor comprising of several layers of which two are thin, metallic, electrically conductive layers separated by a narrow gap. When an object, such as a finger, presses down on a point on the panel's outer surface the two metallic layers become connected at that point: the panel then behaves as a pair of voltage dividers with connected outputs. This physical change therefore causes a change in the electrical current which is registered as a touch event and sent to the processor for processing.

In some other embodiments the touch input module can further determine a touch using technologies such as visual detection for example a camera either located below the surface or over the surface detecting the position of the finger or touching object, projected capacitance detection, infra-red detection, surface acoustic wave detection, dispersive signal technology, and acoustic pulse recognition. In some embodiments it would be understood that 'touch' can be defined by both physical contact and 'hover touch' where there is no physical contact with the sensor but the object located in close proximity with the sensor has an effect on the sensor.

The apparatus 10 can in some embodiments be capable of implementing the processing techniques at least partially in hardware, in other words the processing carried out by the processor 15 may be implemented at least partially in hardware without the need of software or firmware to operate the hardware.

The transceiver 13 in some embodiments enables communication with other electronic devices, for example in some embodiments via a wireless communication network.

The display 12 may comprise any suitable display technology. For example the display element can be located below the touch input module and project an image through the touch input module to be viewed by the user. The display 12 can employ any suitable display technology such as liquid crystal display (LCD), light emitting diodes (LED), organic light emitting diodes (OLED), plasma display cells, Field emission display (FED), surface-conduction electron-emitter displays (SED), and Electophoretic displays (also known as electronic paper, e-paper or electronic ink displays). In some embodiments the display 12 employs one of the display technologies projected using a light guide to the display window.

The display touch input module 11 and display 12 can as described herein be configured such that the underside of the window for the display assembly component can be located at least one pad which can be driven by an actuator or transducer 103 located underneath the pad. The motion of the transducer 103 can then be passed through the pad 101 to the display 12 which can then be felt by the user. The transducer or actuator 103 can in some embodiments be a piezo or piezo electric transducer configured to generate a force, such as a bending force when a current is passed through the transducer. This bending force is thus transferred via the pad 101 to the display 12. It would be understood as described herein that the actuator or transducer can be any suitable transducer. Furthermore in some embodiments the actuator/transducer can be configure to drive the window of the display directly—in other words with no pad or other force transmitter.

Figure 2:
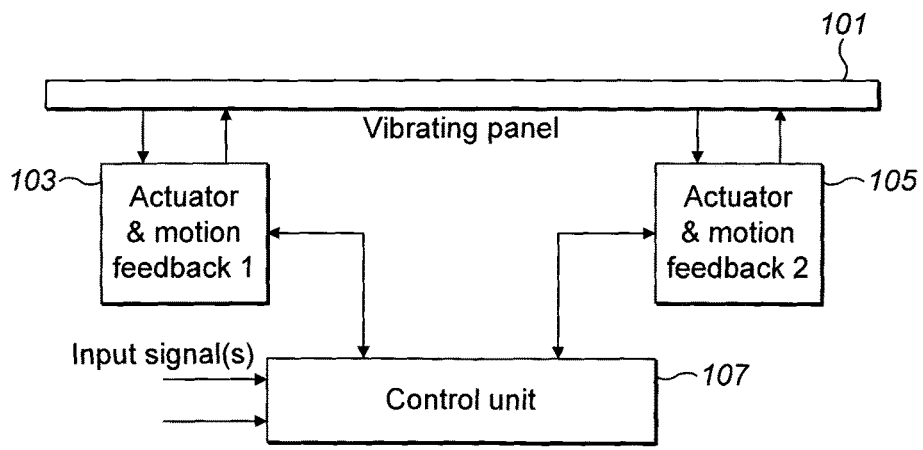
FIG. 2 shows schematically an example tactile effect control system apparatus suitable for implementing some embodiments.

With respect to FIG. 2 an overview of the tactile effect control system apparatus suitable for implementing embodiments is shown. Furthermore with respect to FIG. 19 a flow diagram of the operation of the example tactile effect control system is described.

In the example shown the tactile effect control system apparatus comprises a control unit 107. The control unit 107 is configured to receive at least one input signal from a tactile or audio signal generator (input signal). In some embodiments this electrical input signal is the actuation input, in other words at least one part of location of the surface is intended to follow the signal. Thus for example the display assembly component has a displacement for at least one location (typically the location over the transducer) based on at least one actuation input. The tactile signal and/or audio signal generator can be configured to be any suitable tactile signal and/or audio signal generating means suitable for providing at least one signal representing a desired (height) position of the panel at a defined location (length and width).

Figure 19:
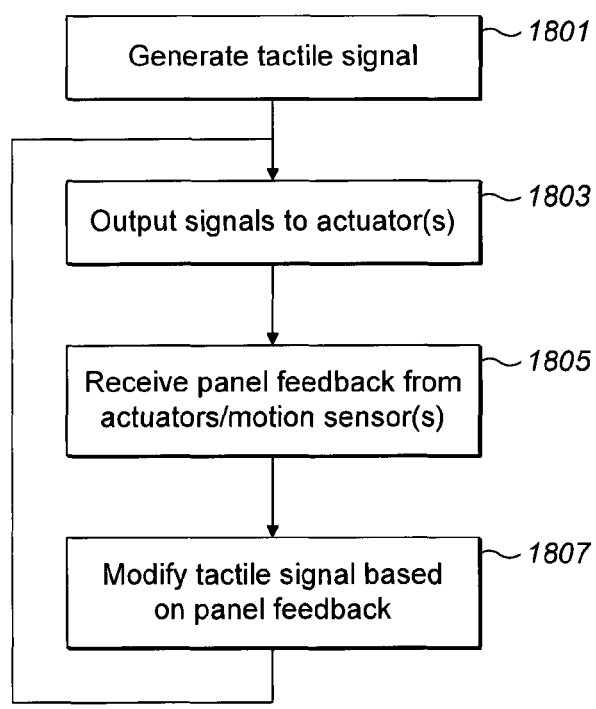
FIG. 19 shows a flow diagram of the operation of the touch effect control system apparatus with respect to some embodiments.

The operation of generating the tactile signal is shown in FIG. 19 by step 1801.

The control unit 107 is configured to output actuator signals to at least a first actuator and motion feedback unit 103 and a second actuator and motion feedback unit 105.

The control unit 107 can thus be configured to receive the tactile audio signal and output the tactile audio signal to the appropriate actuator and motion feedback unit.

The operation of outputting the signal to the actuator is shown in FIG. 19 by step 1803.

The control unit 107 can furthermore in some embodiments be configured to receive motion feedback or positional information about the panel from at least one of the first actuator and motion feedback unit 103 and the second actuator and motion feedback unit 105.

The operation of receiving the panel feedback from the actuators/motion sensors is shown in FIG. 19 by step 1805.

The control unit 107 can be configured to compare the input signal with the feedback from the actuator and motion feedback units and modify the output from the control unit 107.

The control unit 107 can for example be configured to perform a control operation modifying the input signal based on the received actuator and motion feedback unit signals.

The operation of modifying the tactile signal based on the panel feedback is shown in FIG. 19 by step 1807.

The control unit can then output these modified signals to at least one actuator and motion feedback unit.

The operation of outputting the modified signal is show by the loop back to the outputting of the signal to the actuators in step 1803 of FIG. 19.

The control unit 107 as shown in FIG. 2 can be any suitable controller. For example the control unit 107 can be seen as operating as a feedback controller in FIG. 2, however in some embodiments the control unit can be a feedforward controller.

In some embodiments the control unit 107 can be configured to control the output actuation signal for at least one actuator and motion feedback unit dependent on the input signal for the at least one actuator and motion feedback unit and the feedback from the vibrating panel in terms of motion feedback. The control unit can for example in some embodiments be configured to minimise the error between the input signal (interpreted as a desired displacement of the panel) and the motion feedback signal (the actual displacement of the panel).

Thus for example this can be interpreted for a driven actuator as attempting to compensate for any deviations in the position of the driven position because of the mechanical parameters of the display (for example the rigidity, inertia of the material used to form the display) and the mechanical parameters of the actuator (for example the impulse response of the actuator).

For both non-driven and driven actuators then the control unit 107 can be configured to compensate for any deviations in the position of panel at the location caused by other driven actuators driving other parts of the panel. In other words dynamically damping the at the other actuator motion.

This control unit can in some embodiments be a simple single closed loop controller where the control unit receives an input signal for an actuator and motion feedback unit, a single output to the actuator and motion feedback unit and the feedback signal from the actuator and motion feedback unit. In such embodiments there can be at least one of the control units 107 per actuator and motion feedback unit.

In some embodiments the control unit 107 comprises a multi-input and multi-output control unit 107 wherein the controller is configured to receive the input signals for more than one actuator and motion feedback unit, output to more than one actuator and motion feedback unit and monitor the feedback signals from the more than one actuator and motion feedback unit.

The control unit 107 furthermore can be implemented by any suitable control system implementation. For example the control unit can be a multivariate state space controller, a closed loop transfer function modelled controller, an open loop transfer function controller, a proportional-integral-derivative controller, a neural network controller, a Bayesian controller, a fuzzy logic controller, a genetic algorithm controller.

Although the control unit shown in FIG. 2 shows a centralised controller where the control unit 107 controls both the actuator motion feedback units it would be understood that in some embodiments a localised controller implementation can be used wherein the control unit 107 is divided up into a number of sub control units each responsible for an actuator.

The control logic within the control unit 107 can in some embodiments be configured to enable the selection and activation of the actuators within the actuator and motion feedback units. For example the control unit 107 would be configured to enable selecting which actuators are used to generate the active vibration and which actuators are used for vibration reduction or damping. For example where a high amplitude vibration or audio signal levels are required then more or all the actuators can be used to generate the vibration as compared to where a localised vibration is required and the actuator(s) proximate to the location of the required vibration are actuated and the actuator(s) remote from the location are used to reduce the vibration (damp the vibrations passing along the vibrating panel 101).

The actuator and motion feedback units 103, 105 are configured to receive the actuation signals from the control unit 107 and furthermore in some embodiments supply motion feedback or positional feedback information to the control unit 107.

The actuators within the actuator motion feedback units 103 and 105 are configured to output actuation forces to the vibrating panel 101. The actuator and motion feedback units 103, 105 are configured in such embodiments to monitor or observe the vibrating panel 101. In some embodiments the vibrating panel 101 position (displacement) can be monitored by the actuator and motion feedback units 103, 105. In some other embodiments the motion (such as the speed and acceleration) can also be monitored.

The vibrating panel information monitored by the actuator and motion feedback units 103 and 105 can in some embodiments be passed back to the control unit 107.

The vibrating panel 101 can be any suitable display assembly. In some embodiments the vibrating panel 101 represents the window or glass cover over the display only. However in some embodiments the vibrating panel 101 comprises the display glass cover and the display components underneath.

Figure 3:
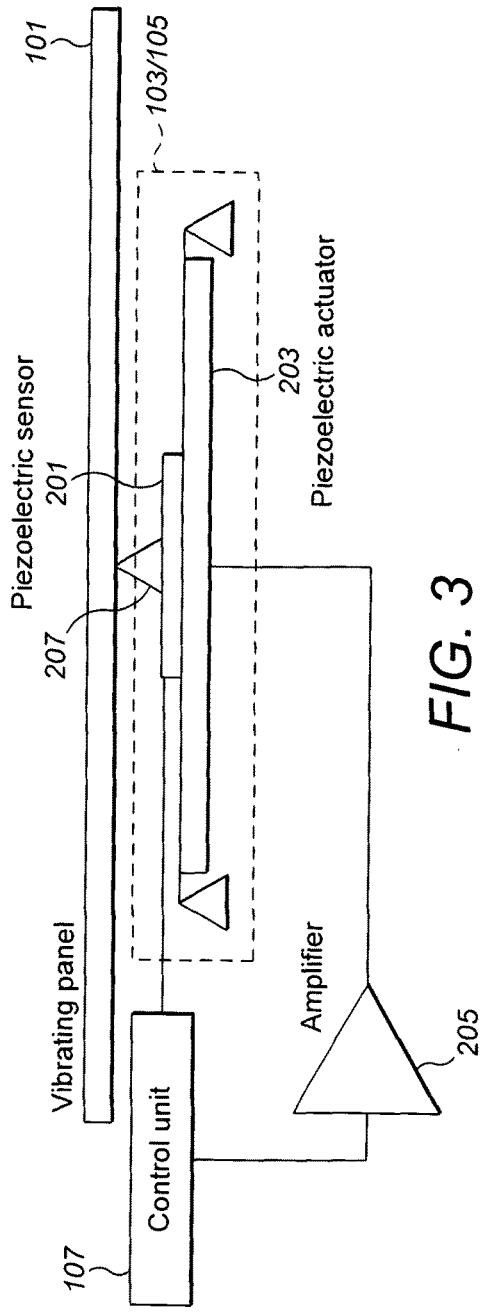
FIG. 3 shows schematically a tactile effect control system apparatus implementing piezoelectric actuators and sensors according to some embodiments.

With respect to FIG. 3 an example piezoelectric actuator and motion feedback unit 103/105 is shown in further detail. In the example shown in FIG. 3 the actuator and motion feedback unit 103/105 comprises a piezoelectric actuator 203. The piezoelectric actuator 203 is configured to receive a driving signal from an amplifier 205, the amplifier having received an output signal from the control unit 107. The piezoelectric actuator 203 can be configured to flex or bend based on the driving signal. The bending or flexing can be configured to produce a force which is transmitted via a pad or force transmitter 207 to a position of underneath the vibrating panel 101.

Furthermore the actuator motion feedback unit 103/105 in some embodiments comprises a piezoelectric sensor 201 located over the piezoelectric actuator 203. The piezoelectric sensor 201 can be configured to monitor the deformation of the actuator thus providing a feedback signal dependent on the compression of the piezoelectric sensor 201. The feedback signal can in some embodiments be passed to the control unit 107 as the positional or motion feedback signal.

The piezoelectric actuator 203 and the piezoelectric sensor 201 can in some embodiments be coupled to the vibrating panel 101 via a pad or force transmitter 207. However it would be understood that in some embodiments the piezoelectric actuator 203 and the piezoelectric sensor 201 can be coupled directly to the panel 101.

In some embodiments the use of piezoelectric actuator 203 and piezoelectric sensor 201 can be part of a single piezoelectric assembly where an isolated area or isolated layers can be used to monitor the deformation of the actuator.

Figure 4:
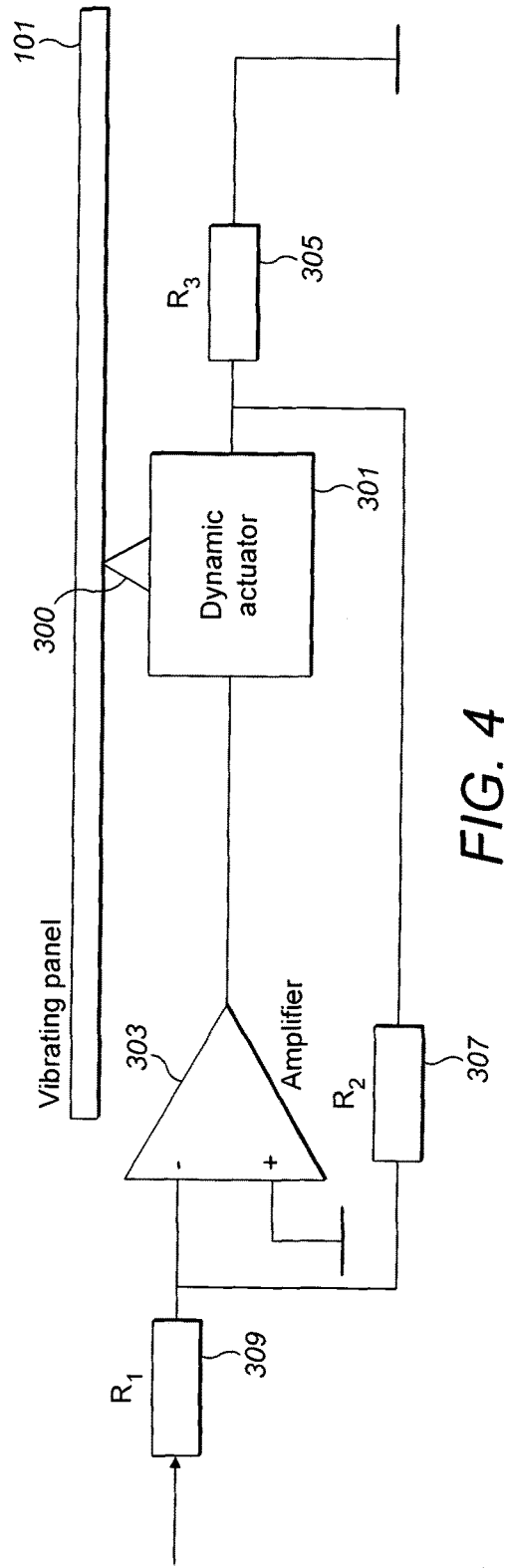
FIG. 4 shows schematically a tactile effect control system apparatus implementing a dynamic actuator according to some embodiments.

With respect to FIG. 4 an example control system implementing a dynamic actuator without a motion sensor and being locally controlled is shown. In the example shown in FIG. 4 the vibrating panel 101 is actuated using a dynamic actuator 301 via a pad 300 configured to transmit the actuator force or motion to the panel.

In some embodiments the dynamic actuator 301 can be configured to receive an input signal which is passed via a feedback amplifier configuration to control the actuator. In other words the current feedback generated by the dynamic actuator 301 under load can be configured to modify the dynamic characteristics of the actuator.

The feedback amplifier configuration can in some embodiments comprise a negative feedback operational amplifier circuit. The circuit can comprise a first input receiving the input signal for the actuator. The first input can further be coupled to a first resistor R1 309 which is coupled to the negative input of an operational amplifier 303. The output of the operational amplifier 303 is passed through a dynamic actuator 301 to a current sensing resistor R3 305. Furthermore a feedback resistor R2 307 is coupled between the junction of dynamic actuator 301 and current-sensing resistor R3 305 and the negative input of the amplifier 303.

The ratio of the resistor or impedance network can thus define the dynamic or characteristics of the actuator. It would be understood that the "operational amplifier" can also be implemented as a power amp with a large open-loop gain and inverting and non-inverting inputs, or a combination of an operational-amplifier and a power amp. Furthermore it would be understood that in some embodiments a double-ended (push-pull) amplifier configuration can be implemented in a manner similar to the single-ended amplifier configuration shown herein.

In some embodiments it can be possible to alter the feedback strategy by increasing the damping by using a 'negative resistance' at the driving amplifier or using a combination of 'negative resistance' and actively synthesised reactive impedance to increase the effective stiffness or moving mass of the contact point.

In such embodiments it can be possible to control the dynamic characteristics without any modification of the actuator. However such implementations of using a negative resistance can require additional operational amplifiers.

Figure 5:
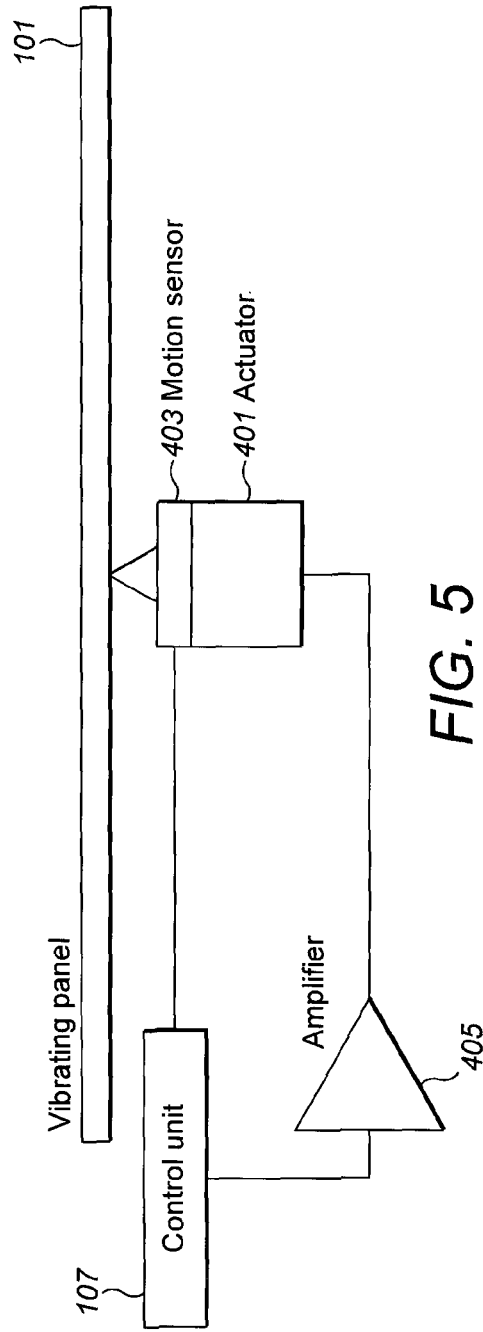
FIG. 5 shows schematically a tactile effect control system apparatus implementing a motion sensor and an actuator according to some embodiments.

With respect to FIG. 5 an example control system wherein the actuator and motion feedback unit 103/105 comprises a piezoelectric actuator 401 coupled with a motion sensor 403 is shown. In such embodiments the actuator 401 can be configured to receive a driving signal from an amplifier 405, the amplifier 405 receiving the control unit output signal from the control unit 107. The motion sensor 403 can in such embodiment be configured to output a feedback signal to the control unit 107 based on the observation of the vibrating panel 101.

In such embodiments the motion sensor can be implemented as any suitable sensor such as MEMS accelerometer or an optical position sensor.

Figure 6:
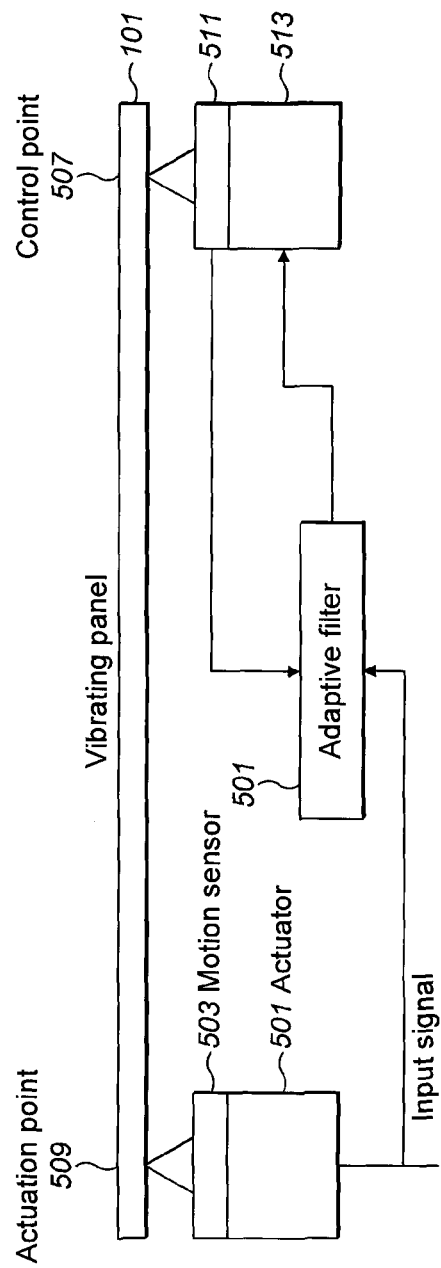
FIG. 6 shows schematically a tactile effect control system apparatus implementing adaptive filter control according to some embodiments.

With respect to FIG. 6 a further localised control unit example is shown. In the example shown in FIG. 6 there is an actuation point 509 and a control point 507 on a panel (in other words a driven actuator and a damping actuator). In the example shown in FIG. 6 an input with an input signal is coupled to and configured to drive an actuator 505 at the actuation point via a pad. Furthermore the actuator 505 is coupled to a motion sensor 503 such as an accelerometer or optical position sensor to monitor the motion of the panel at the actuation point 509.

Furthermore the vibrating panel shows a control point 507 where is located a second actuator 513 and motion sensor 511 configuration.

In the example shown in FIG. 6 the controller is localised such that an adaptive filter 501 is configured to receive the input signal (for the actuation of the actuation point actuator) and further receive a feedback signal regarding the motion or position of the vibrating panel 101 at the control point 507. The adaptive filter 501 can be configured to generate a driving signal for the control point actuator 513 dependent or based on the input signal for the actuation point and the control point sensing to control the motion of the vibrating panel 101 at the control point such that the control point is maintained or substantially maintained as having no motion.

In such embodiments it can be possible to drive the system simultaneously with multiple signals as the localised control attempts to adapt for the motion of the vibrating panel based on actuations other than at the control point.

Although the above examples have been described with regards to a sensor/actuator pairing per position or point it would be understood that from a practical circuit implementation perspective there can be a difference between the systems with a separate sensor and systems where intrinsic motion sensing is used.

Furthermore it would be understood that the control can be applied to either a full signal frequency range or to parts (bands) of the range. In some embodiments frequency selective control can be provided such that some audio applications require the entire surface to vibrate at the lower frequency and only control the mid-range.

Furthermore in some embodiments the control can be limited to frequencies other than where the control of the highest frequencies becomes difficult due to the complex vibrational patterns of the surface. This would be acceptable as the sensitivity of human touch decreases with increasing frequency and as such a bandwidth limit to the tactile feedback to the frequency range where precise control of location is possible could be implemented.

Furthermore bandwidth limit limitation can in some embodiments be used to limit unwanted sound radiation.

It would be in understood that in some embodiments each of the motion sensor/actuator pairs need not be identical. Furthermore in some embodiments the controller unit 107 can be used to allow for any differences between the actuator and motion feedback units. Thus in some embodiments where some actuator and motion feedback units are intended or implemented for large amplitude displacement and others for more linear wideband audio or earpiece displacement the control system can be used to balance these differences.

Furthermore it would be understood that in some embodiments the control system can be used to assist vibration reduction where systems such as partial mechanical reduction is implemented.

With regards to FIG. 7 an example grid arrangement of the actuator and motion feedback unit locations is shown. The apparatus as shown in FIG. 7 comprises a vibrating panel 101 as seen from above and furthermore shows the position of the actuator and motion feedback units underneath the panel 101. The positions in the example shown form a regular grid pattern, arranged in a 3 row and 3 column form with actuator and motion feedback units located at top left 611, top centre 612, top right 613, mid left 621, mid centre 622, mid right 623, bottom left 631, bottom centre 632, and bottom right 633 locations. However it would be understood that any number, location or arrangement of actuator and motion feedback units can be implemented.

Furthermore in the embodiments as described herein the actuator and motion feedback unit operates as a single unit. In some embodiments it would be understood that the actuators and motion feedback units are separated. For example in some embodiments there can be a first grid arrangement of actuators and a second grid arrangement of motion or positional feedback sensors, where the first and second grid are different.

Figure 8A:
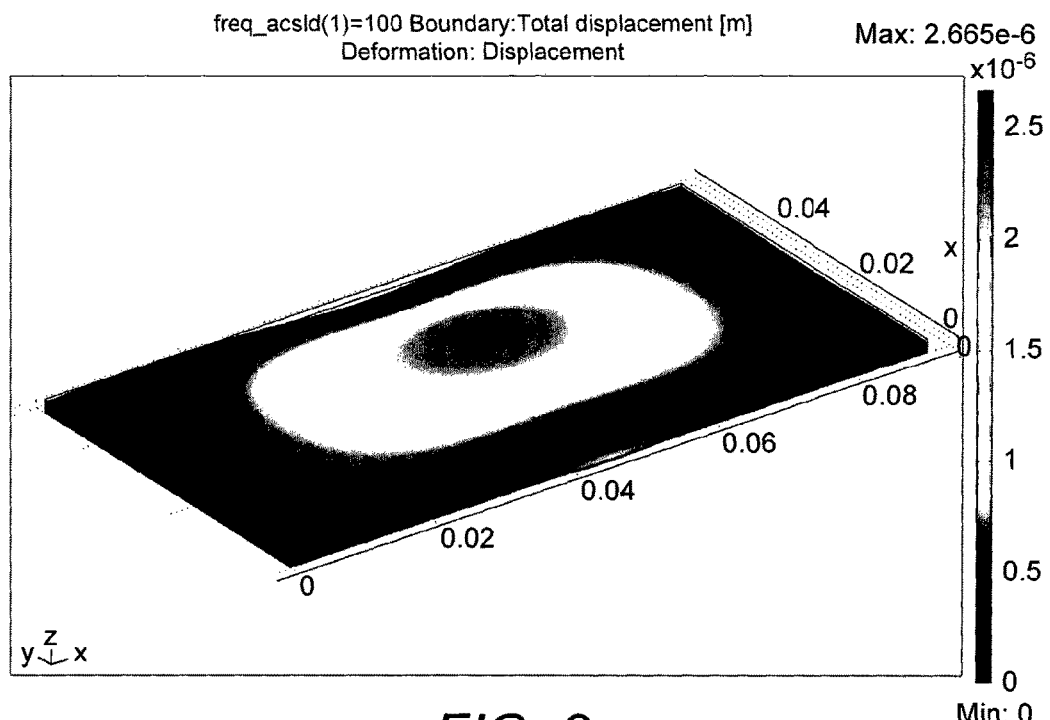
FIGS. 8a and 8b show example centre panel vibrations at 100 Hz with control and without control respectively.
Figure 8B:
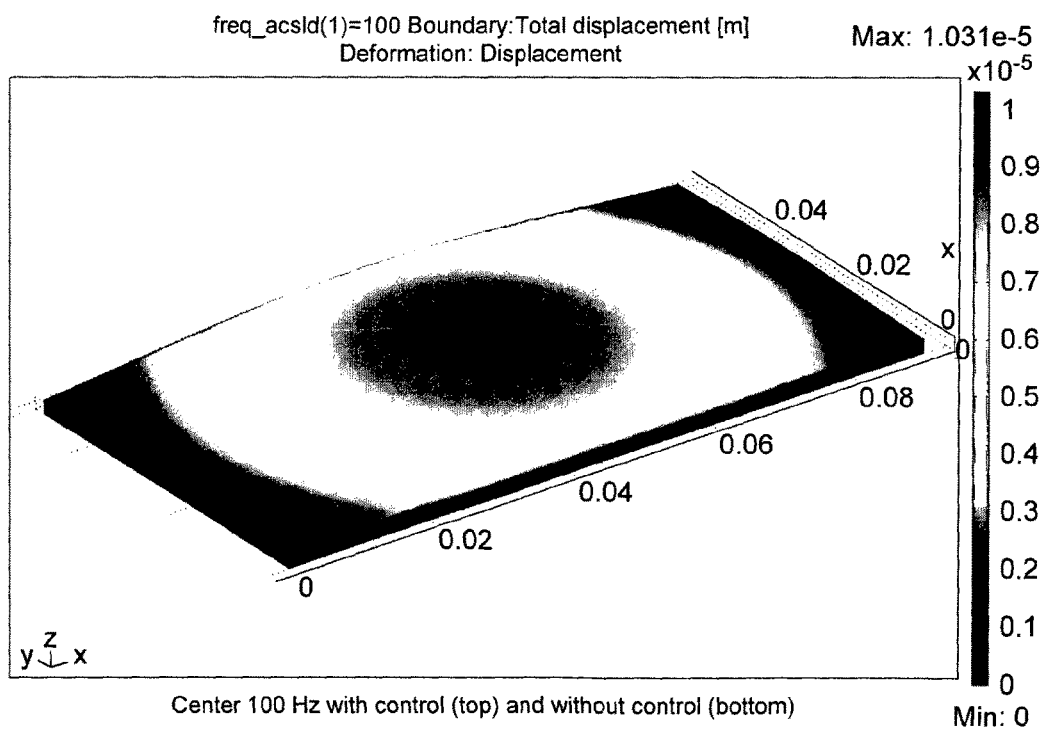

With respect to FIGS. 8a and 8b the surface contours generated by an example centre vibration with control and without control respectively is shown for a 100 Hz signal. As can be seen in FIG. 8a the surface contour vibration is significantly localised with respect to the centre when compared to the surface contour of the same input signal without control as shown in FIG. 8b.

Figure 9A:
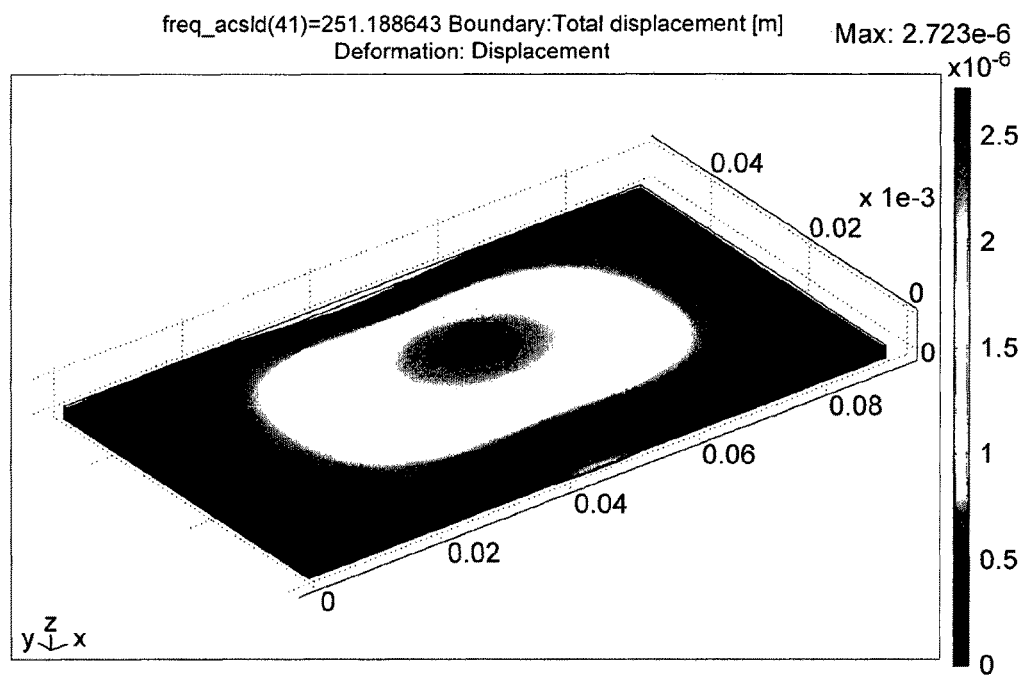
FIGS. 9a and 9b show example centre panel vibrations at 250 Hz with control and without control respectively.
Figure 9B:
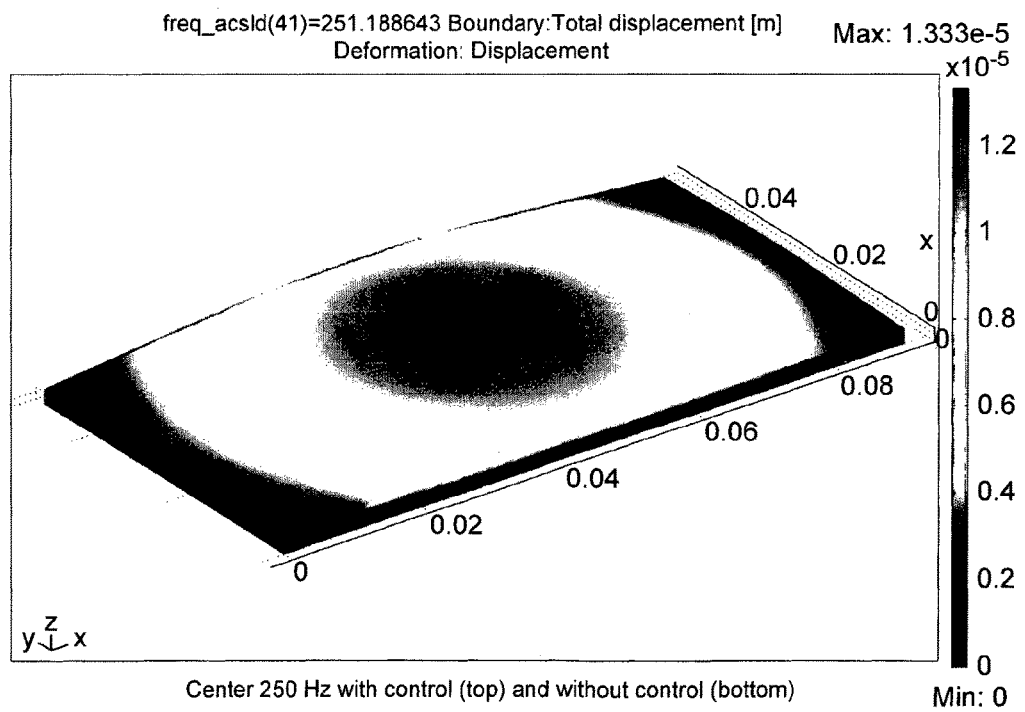

With respect to FIGS. 9a and 9b the surface contours generated by an example centre vibration with control and without control respectively is shown for a 250 Hz signal. As can be seen in FIG. 9a the surface contour vibration is significantly localised with respect to the centre when compared to the surface contour of the same input signal without control as shown in FIG. 9b.

Figure 10A:
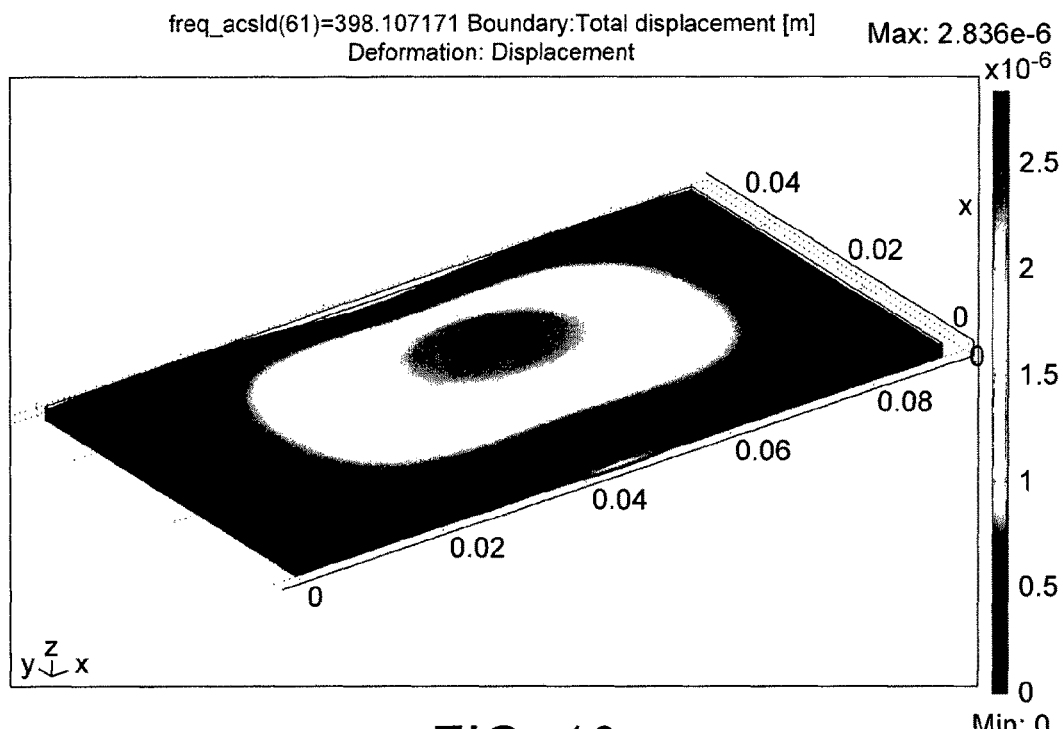
FIGS. 10a and 10b show example centre panel vibrations at 500 Hz with control and without control respectively.
Figure 10B:
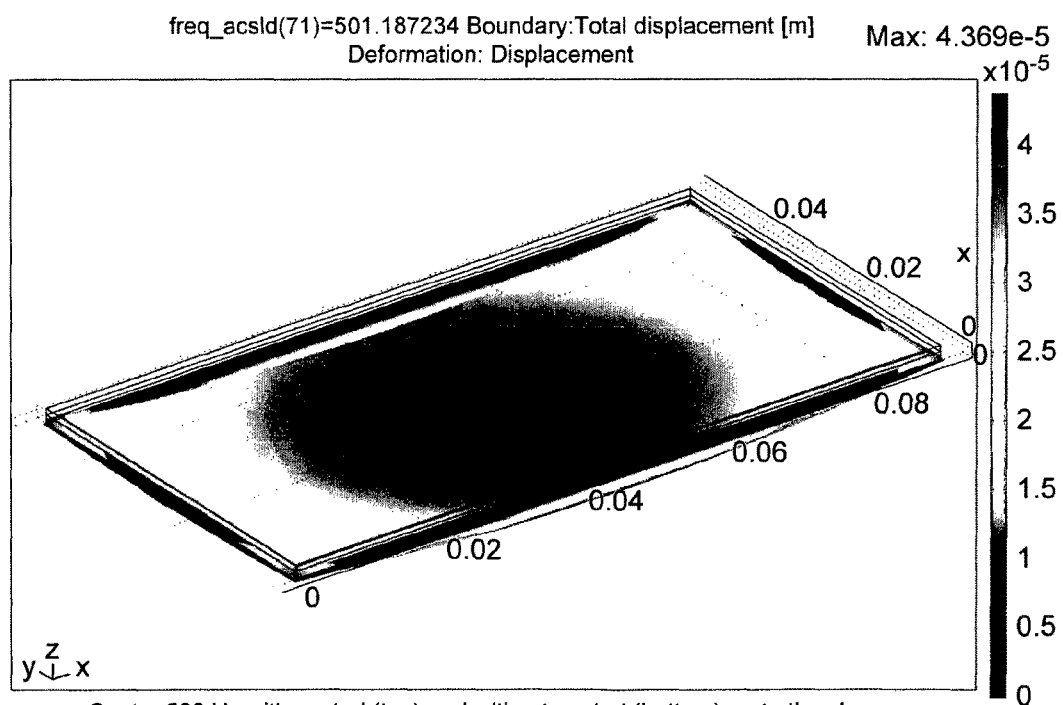

With respect to FIGS. 10a and 10b the surface contours generated by an example centre vibration with control and without control respectively is shown for a 500 Hz signal. As can be seen in FIG. 10a the surface contour vibration is significantly localised with respect to the centre when compared to the surface contour of the same input signal without control which further shows the uncontrolled surface with a phase inversion due to diaphragm resonance as shown in FIG. 10b.

Figure 11A:
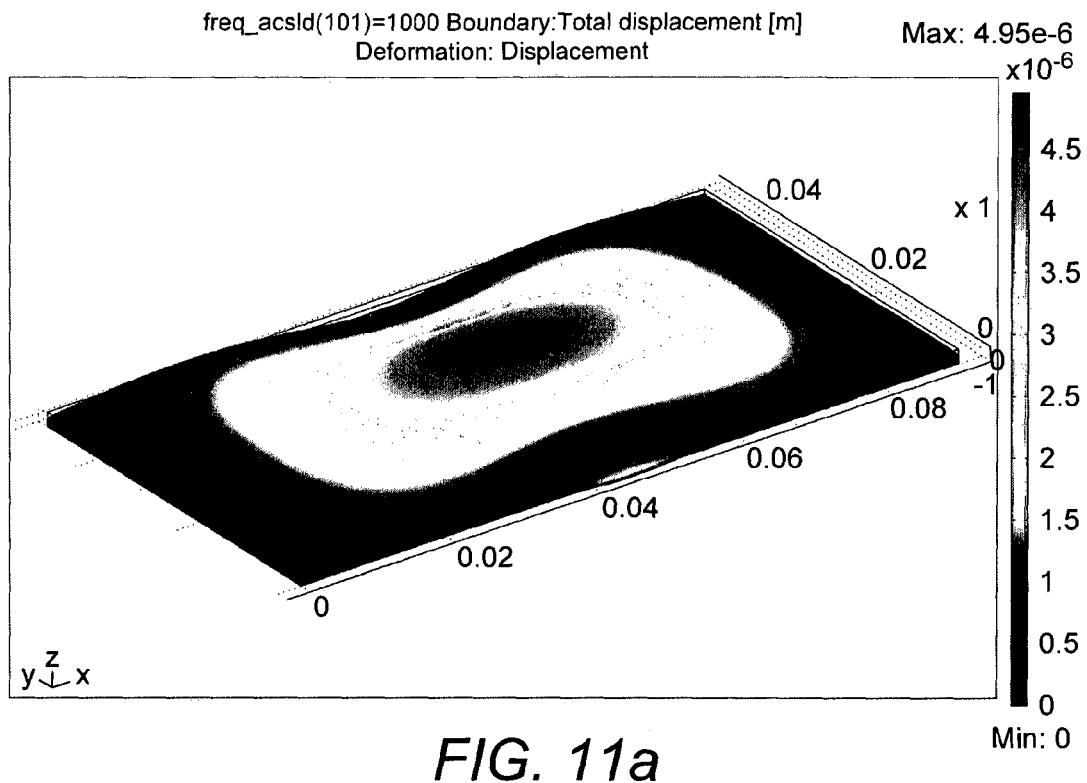
FIGS. 11a and 11b show example centre panel vibrations at 1000 Hz with control and without control respectively.
Figure 11B:
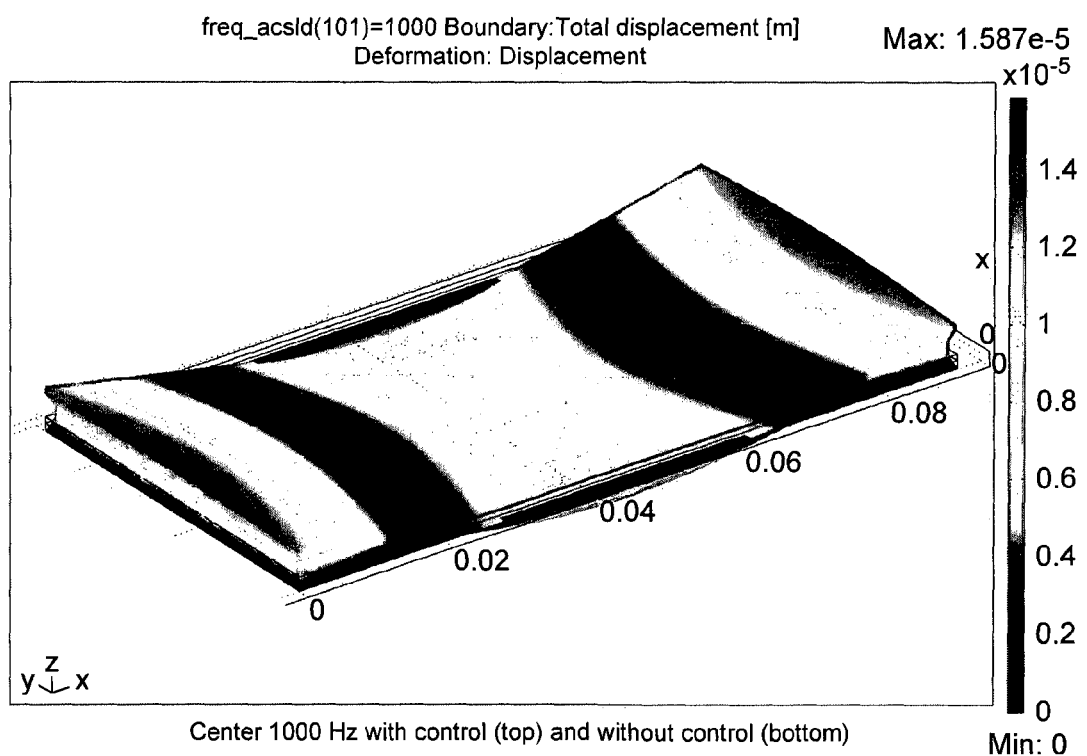

With respect to FIGS. 11a and 11b the surface contours generated by an example centre vibration with control and without control respectively is shown for a 1000 Hz signal. As can be seen in FIG. 11a the surface contour vibration is significantly localised with respect to the centre when compared to the surface contour of the same input signal without control as shown in FIG. 11b where the actuation has generated an inverted central band.

Figure 12A:
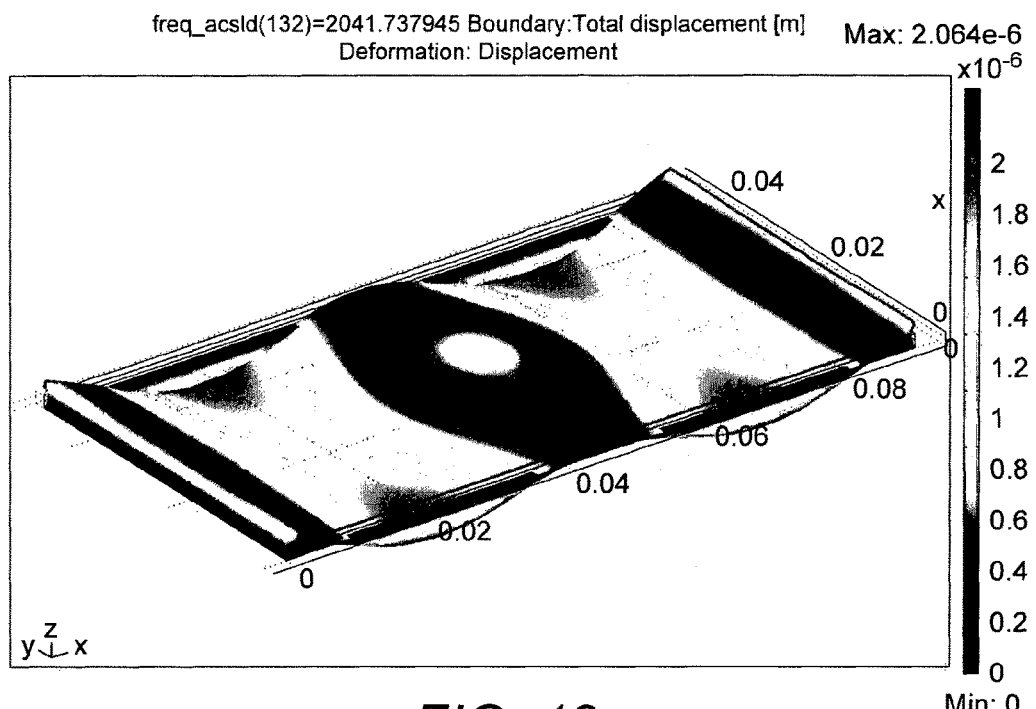
FIGS. 12a and 12b show example centre panel vibrations at 2000 Hz with control and without control respectively.
Figure 12B:
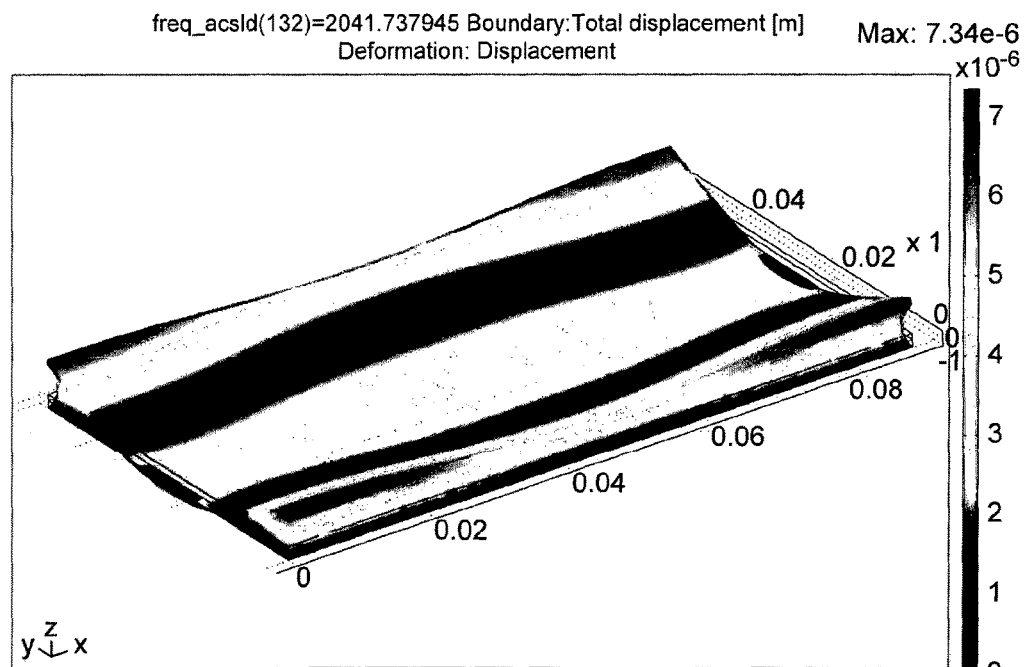

With respect to FIGS. 12a and 12b the surface contours generated by an example centre vibration with control and without control respectively is shown for a 2000 Hz signal. As can be seen in FIG. 12a the control of the surface contour vibration whilst being localised with respect to the centre when compared to the surface contour of the same input signal without control as shown in FIG. 12b is demonstrating that the vibrational patterns at high frequencies the are such that control of vibration becomes practically impossible once the wavelength of the bending wave is shorter than the distance between the control points.

Figure 13A:
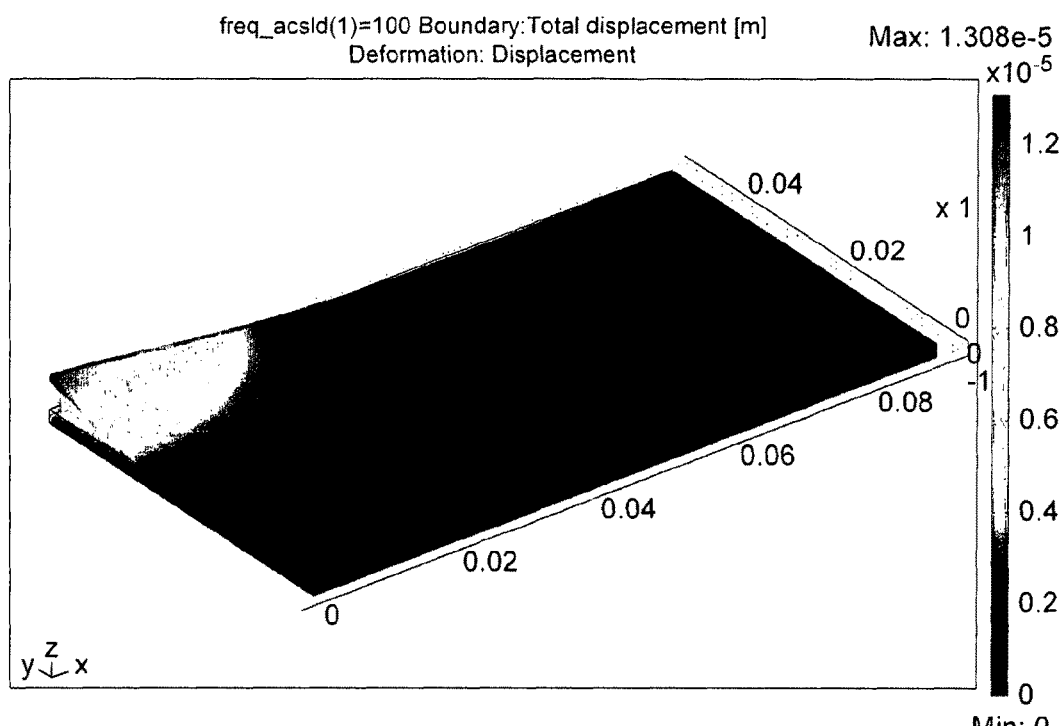
FIGS. 13a and 13b show example corner panel vibrations at 100 Hz with control and without control respectively.
Figure 13B:
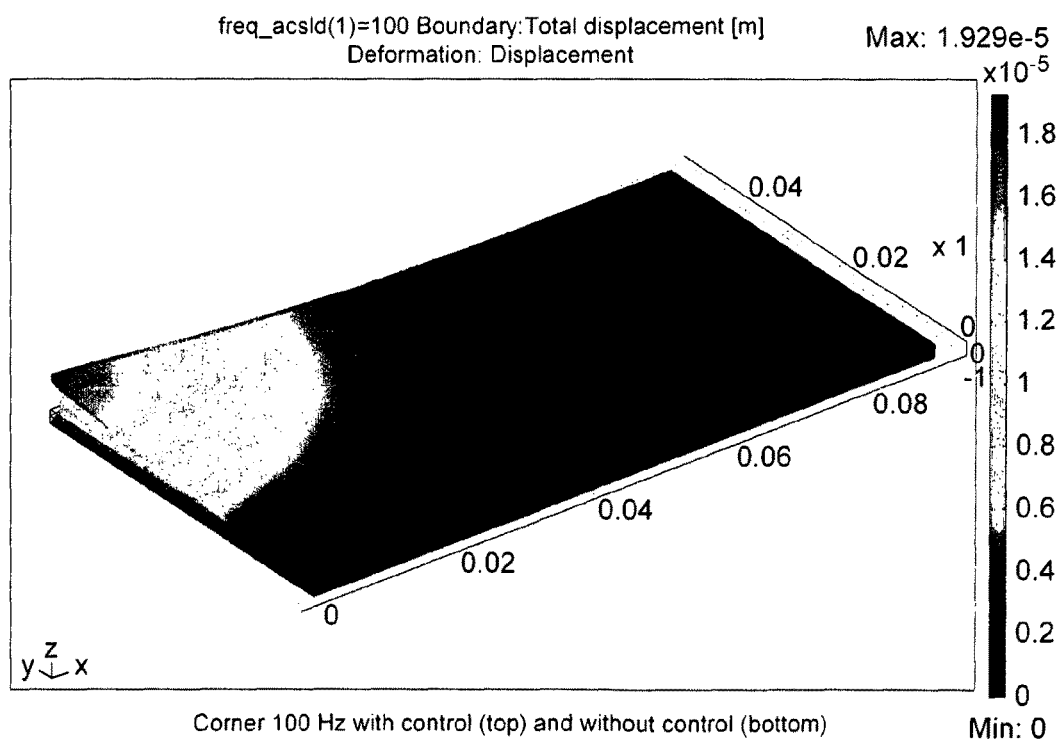

With respect to FIGS. 13a and 13b the surface contours generated by an example corner vibration with control and without control respectively is shown for a 100 Hz signal. As can be seen in FIG. 13a the surface contour vibration is significantly localised with respect to the corner in the same manner as shown in the centre vibration shown in FIG. 8a, when compared to the surface contour of the same input signal without control as shown in FIG. 13b.

Figure 14A:
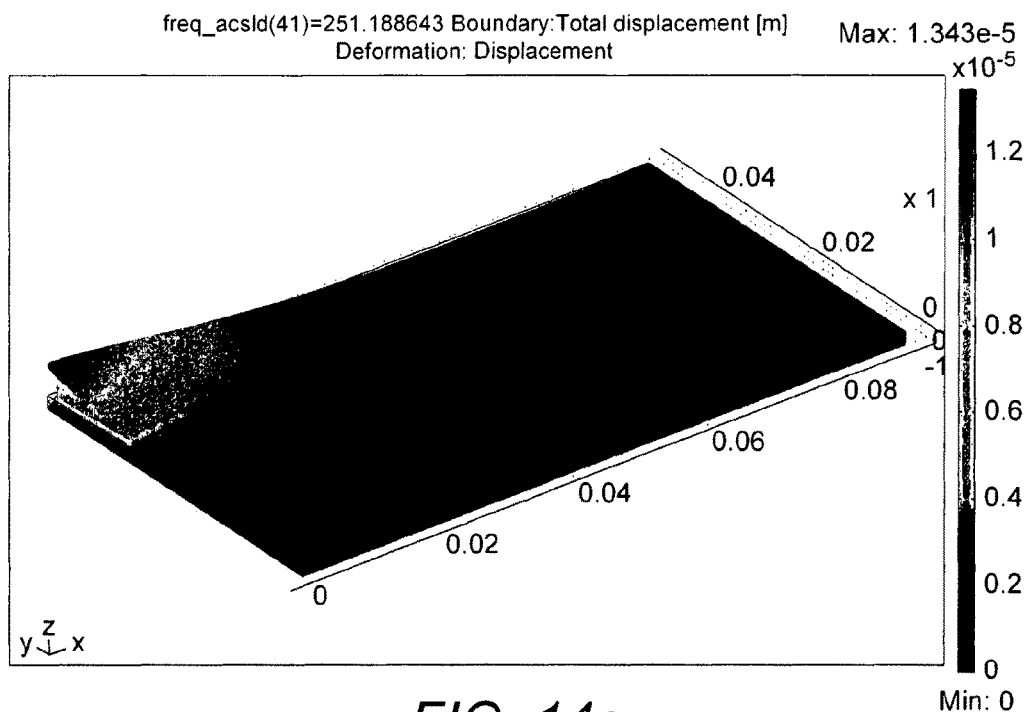
FIGS. 14a and 14b show example corner panel vibrations at 250 Hz with control and without control respectively.
Figure 14B:
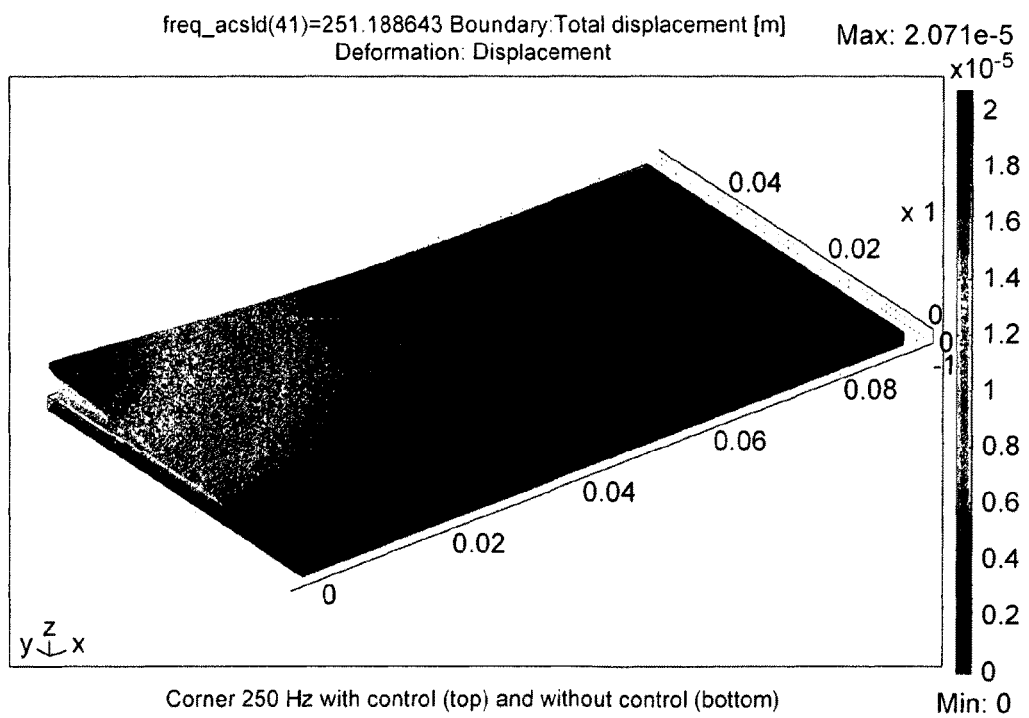

With respect to FIGS. 14a and 14b the surface contours generated by an example corner vibration with control and without control respectively is shown for a 250 Hz signal. As can be seen in FIG. 14a the surface contour vibration is localised with respect to the corner when compared to the surface contour of the same input signal without control as shown in FIG. 14b.

Figure 15A:
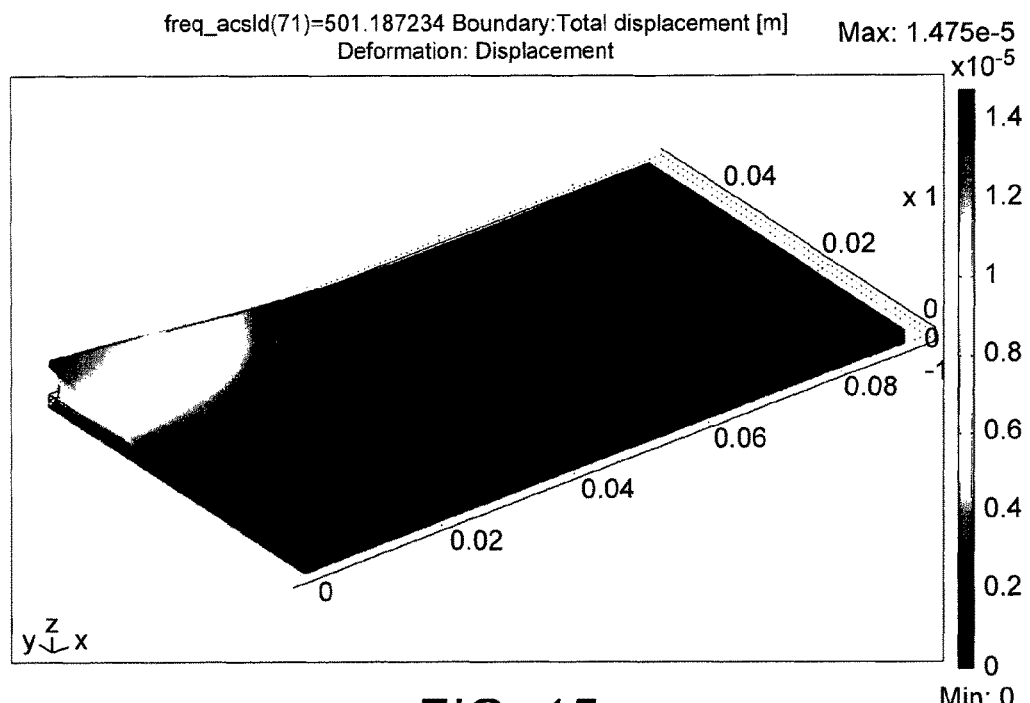
FIGS. 15a and 15b show example corner panel vibrations at 500 Hz with control and without control respectively.
Figure 15B:
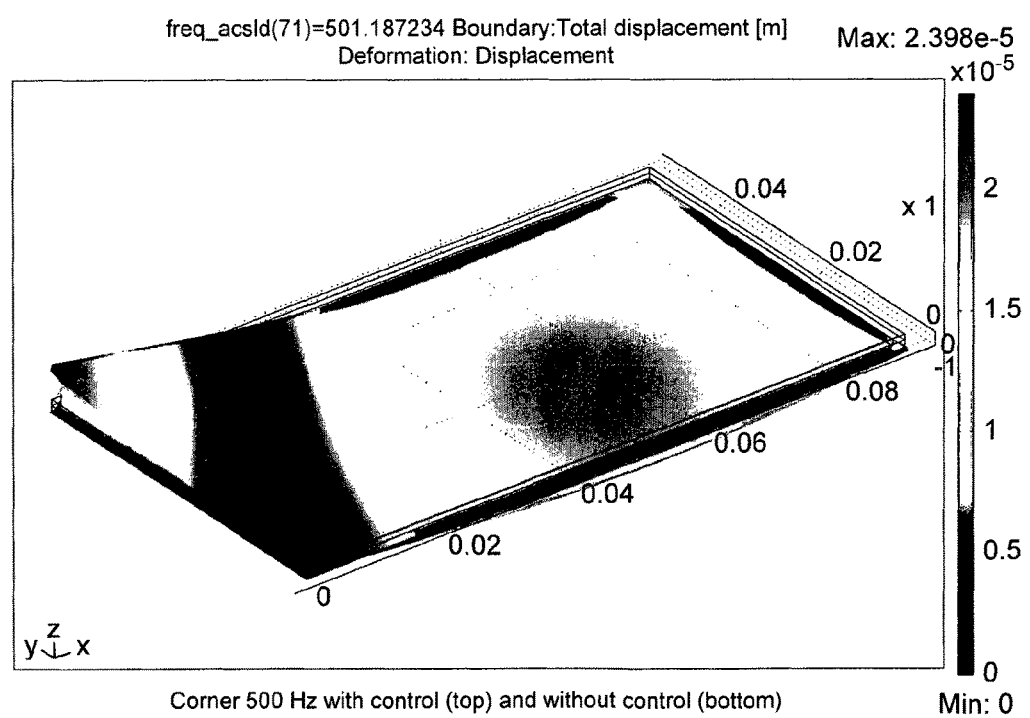

With respect to FIGS. 15a and 15b the surface contours generated by an example corner vibration with control and without control respectively is shown for a 500 Hz signal. As can be seen in FIG. 15a the surface contour vibration is also localised with respect to the corner as compared to the surface contour of the same input signal without control as shown in FIG. 15b.

Figure 16A:
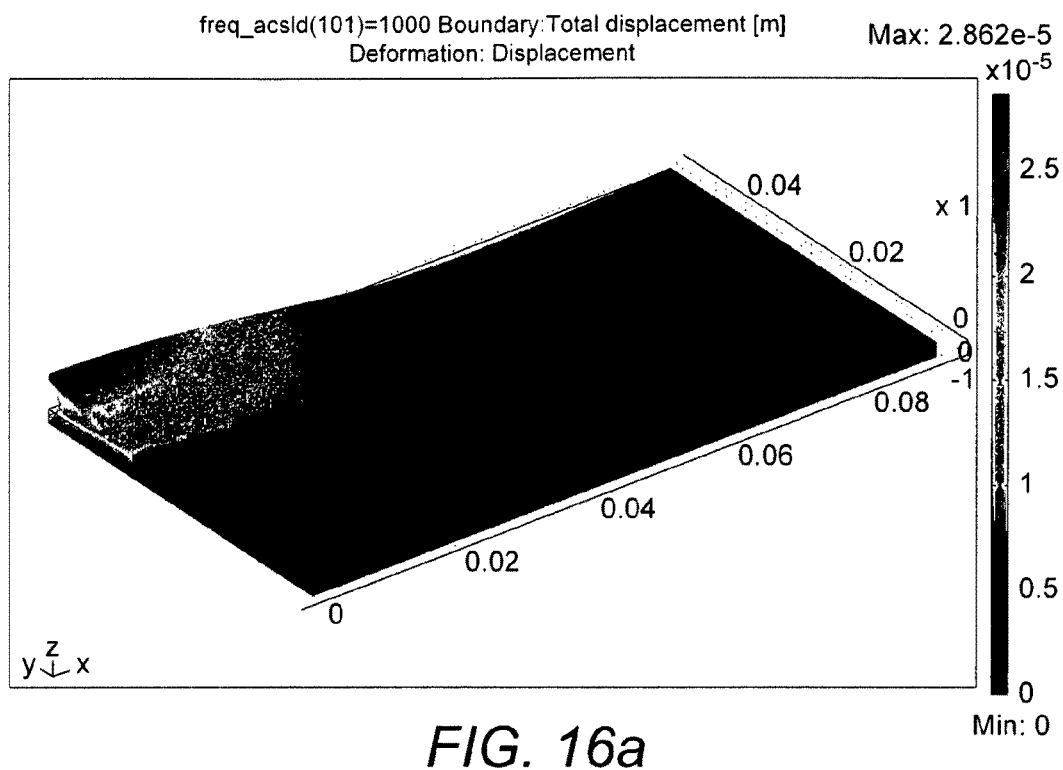
FIGS. 16a and 16b show example corner panel vibrations at 1000 Hz with control and without control respectively.
Figure 16B:
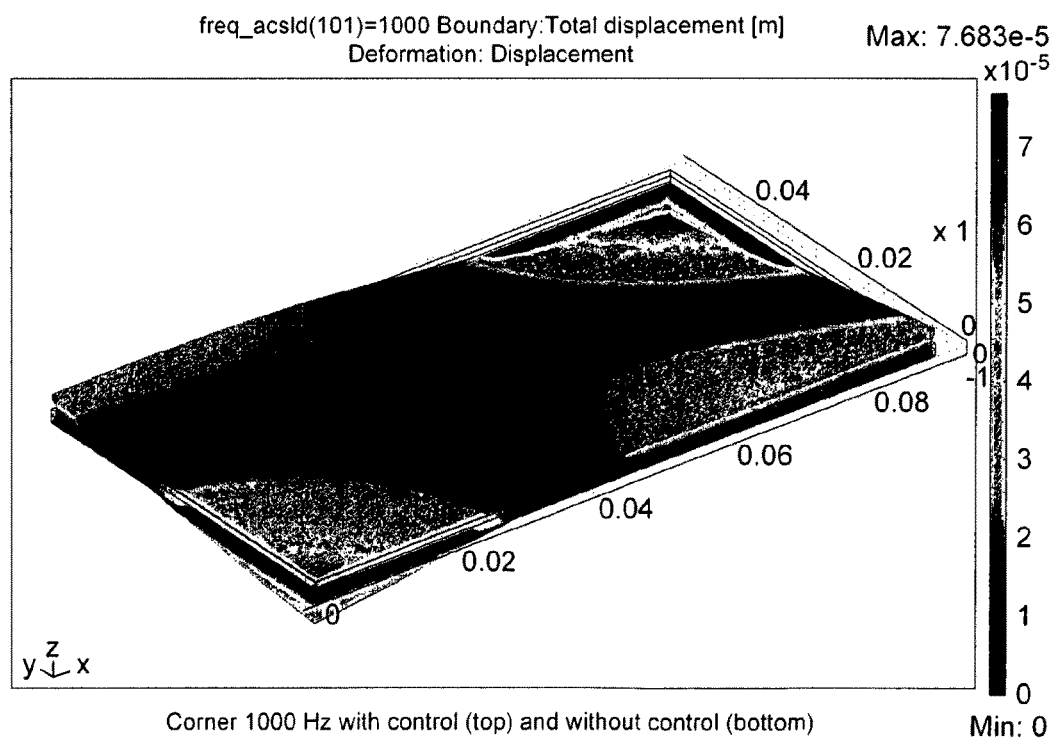

With respect to FIGS. 16a and 16b the surface contours generated by an example corner vibration with control and without control respectively is shown for a 1000 Hz signal. As can be seen in FIG. 16a the surface contour vibration is localised with respect to the corner when compared to the surface contour of the same input signal without control as shown in FIG. 16b.

Figure 17A:
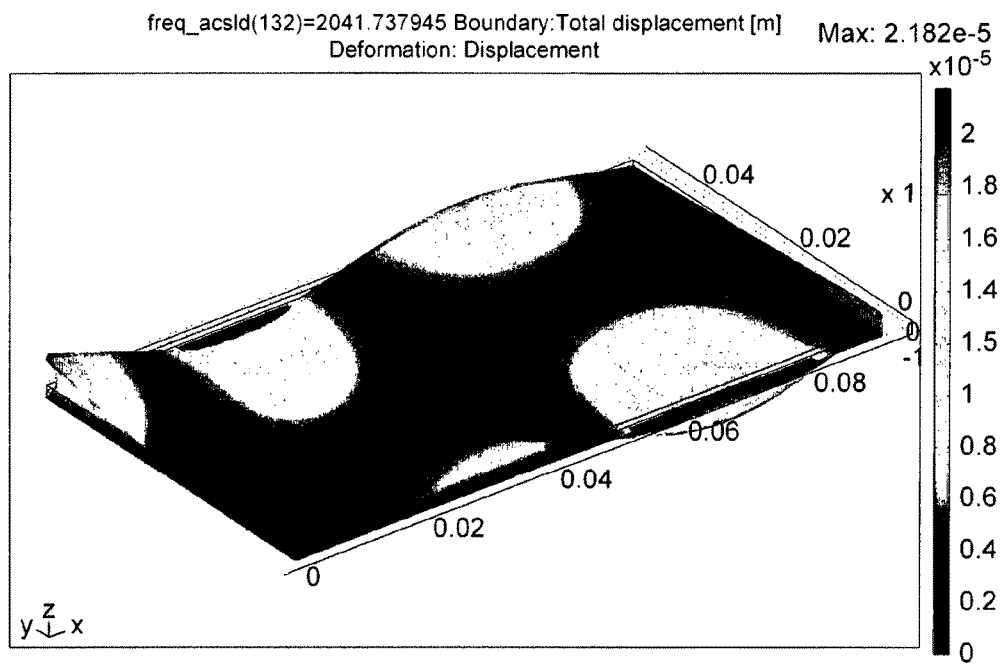
FIGS. 17a and 17b show example corner panel vibrations at 2000 Hz with control and without control respectively.
Figure 17B:
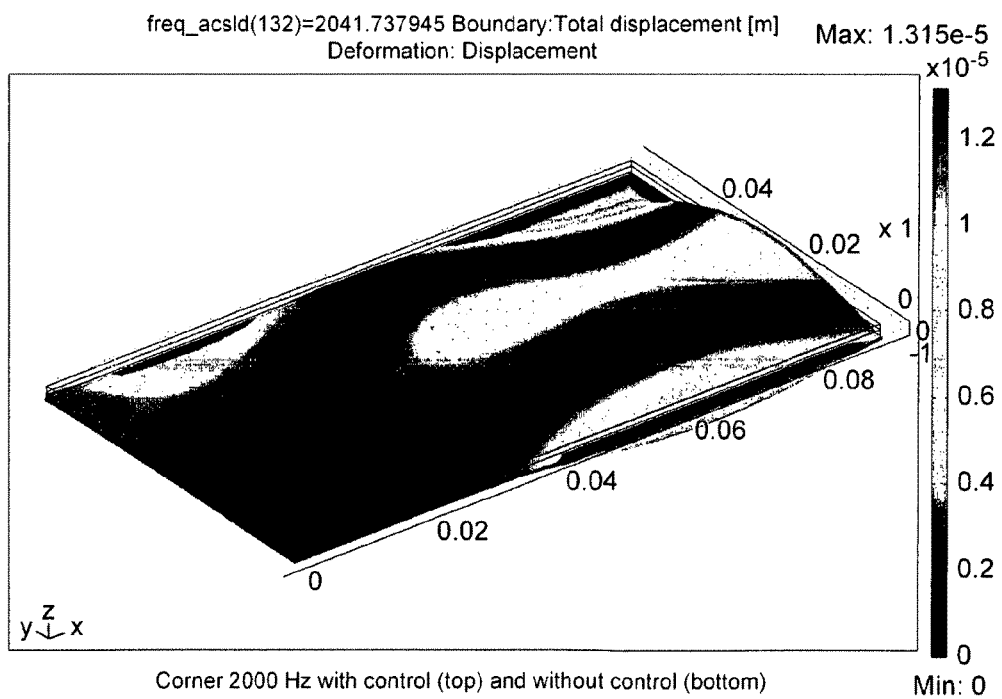

With respect to FIGS. 17a and 17b the surface contours generated by an example centre vibration with control and without control respectively is shown for a 2000 Hz signal. As can be seen in FIG. 17a the control of the surface contour vibration whilst being localised with respect to the centre when compared to the surface contour of the same input signal without control as shown in FIG. 17b is demonstrating that the same issue once the wavelength of the bending wave is shorter than the distance between the control points.

Figure 18:
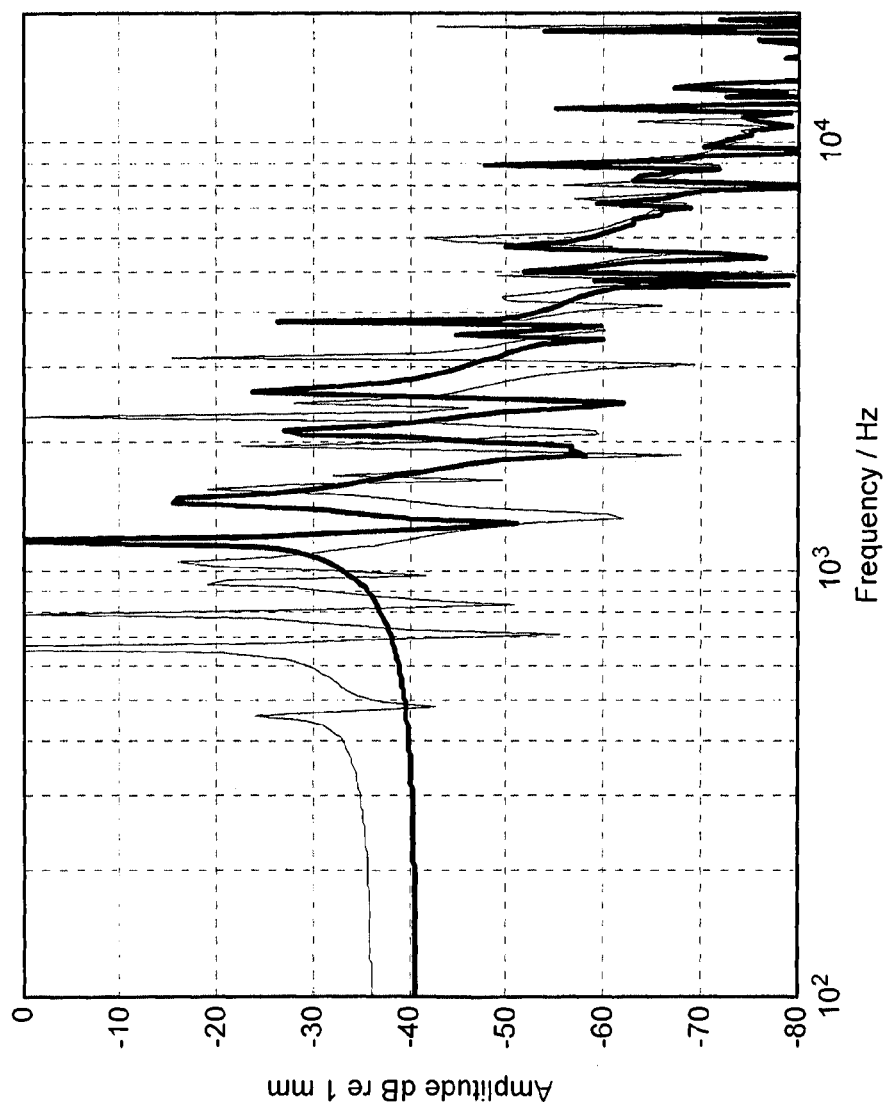
FIG. 18 shows an example point response for a corner panel vibration with control and without control.

With respect to FIG. 18 a point response (displacement magnitude in decibels with regards to 1 mm with 1 N force input) when the corner is driven with control (the thick black line) and without control (the thin black line) at other points. The graph shown confirms that driving and control point geometry used in the examples can move the lowest modes upwards by at least one octave. In other words corresponding to the ratio control point spacing as compared to the overall panel size.

The example simulations shown from FIGS. 8 to 18 are using a material where the geometry of the panel is approximately 9 cm×5 cm and the material is assumed to be 0.8 mm thick glass. In the examples shown above the panel has no structural damping.

Thus in the embodiments described above it would be understood that by sensing means, actuation means and control means a haptic and audio signal output to a vibrating panel can be localised.

It shall be appreciated that the term user equipment is intended to cover any suitable type of wireless user equipment, such as mobile telephones, portable data processing devices or portable web browsers. Furthermore, it will be understood that the term acoustic sound channels is intended to cover sound outlets, channels and cavities, and that such sound channels may be formed integrally with the transducer, or as part of the mechanical integration of the transducer with the device.

In general, the design of various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The design of embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory used in the design of embodiments of the application may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be designed by various components such as integrated circuit modules.

As used in this application, the term 'circuitry' refers to all of the following:

(a) hardware-only circuit implementations (such as implementations in only analog and/or digital circuitry) and
(b) to combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone or server, to perform various functions and
(c) to circuits, such as a microprocessor(s) or a portion of a microprocessor(s), that require software or firmware for operation, even if the software or firmware is not physically present.

This definition of 'circuitry' applies to all uses of this term in this application, including any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or applications processor integrated circuit for a mobile phone or similar integrated circuit in server, a cellular network device, or other network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising:
   at least two actuators configured to provide a force to move a display assembly component at least at two separate locations of the display assembly component to generate at least one of haptic feedback and sound based on an application run by the apparatus such that at least one of the at least two separate locations of the display assembly component has a displacement based on at least one actuation input, wherein the at least one actuation input is an actuator input signal for a first of the at least two actuators and provides a driving signal for a second of the at least two actuators;
   at least one sensor configured to determine the displacement of the display assembly component, wherein the sensor is configured to provide a feedback signal, wherein the feedback signal drives the second of the at least two actuators by adjusting the driving signal concurrently with the first actuator being driven; and
   a control unit configured to control at least in part a frequency response as generated by the at least two actuators when the display assembly component is actuated based on the at least one actuation signal, while adjusting the activation of the second of the at least two actuators to generate the at least one of haptic feedback and sound by the display assembly component in a region defined by the location of the first actuator.

2. The apparatus as claimed in claim 1, wherein at least one of the at least two actuators and at least one sensor are an integrated actuator.

3. The apparatus as claimed in claim 1, wherein at least one of the at least two actuators comprises a piezoelectric actuator.

4. The apparatus as claimed in claim 1, wherein the at least one sensor comprises a piezoelectric sensor.

5. The apparatus as claimed in claim 3, wherein the at least one sensor is located between the at least one piezoelectric actuator of the at least two actuators and the display assembly component.

6. The apparatus as claimed in claim 1, wherein the apparatus further comprises a pad located between at least one of the at least two actuators and the display assembly component.

7. The apparatus as claimed in claim 6, wherein the pad is configured to transmit the actuator force to the display assembly component at one of the at least two separate locations.

8. The apparatus as claimed in claim 1, wherein the display assembly component comprises a display panel.

9. The apparatus as claimed in claim 1, wherein the control unit comprises a feedback amplifier circuit, such that the feedback generated by the at least one sensor under load is configured to modify a dynamic characteristic of at least one of the at least two actuators.

10. The apparatus as claimed in claim 1, wherein the at least one actuation input comprises an actuator input signal for a first of the at least two actuators, and the sensor and feedback signal are associated with the first of the at least two actuators.

11. The apparatus as claimed in claim 10, wherein the control unit is configured to control the first of the at least two actuators to compensate for motion of the display assembly component in a region defined by the location of the first actuator caused by motion of the display assembly component by at least one other of the at least two actuators.

12. The apparatus as claimed in claim 1, wherein the control unit comprises an adaptive filter.

13. An apparatus comprising at least one processor and at least one memory including computer code for one or more programs, the at least one memory and the computer code configured to with the at least one processor cause the apparatus to at least:
   generate at least one actuation signal for at least two actuators configured to provide a force to move a display assembly component to generate at least one of haptic feedback and sound based on an application run by the apparatus at least at two separate locations of the display assembly component such that at least one of the at least two separate locations of the display assembly component has a displacement based on the at least one actuation signal, wherein the at least one actuation signal comprises an actuator input signal for a first of the at least two actuators and provides a driving signal for a second of the at least two actuators;
   receive a feedback signal from at least one sensor configured to determine the displacement of the display assembly component;
   control the at least one of the at least two actuators based on the at least one actuation input signal and the feedback signal; and
   associate the sensor and feedback signal to drive the second of the at least two actuators by adjusting the driving signal concurrently with the first actuator being driven, such that control, at least in part, of a frequency response as generated by the at least two actuators when the display assembly component is actuated is based on the at least one actuation while adjusting the activation of the second of the at least two actuators to generate the at least one of haptic feedback and sound by the display assembly component in a region defined by the location of the first actuator.

14. A method comprising:
   generating at least one actuation signal for at least two actuators configured to provide a force to move a display assembly component at least at two separate locations of the display assembly component such that at least one of the at least two separate locations of the display assembly component generates at least one of haptic feedback and sound based on an application run by the apparatus has a displacement based on the at least one actuation signal, wherein the at least one actuation signal comprises an actuator input signal for a first of the at least two actuators and provides a driving signal for a second of the at least two actuators;

receiving a feedback signal from at least one sensor configured to determine the displacement of the display assembly component;

controlling the at least one of the at least two actuators based on the at least one actuation input and the feedback signal; and associating the sensor and feedback signal to drive the second of the at least two actuators by adjusting the driving signal concurrently with the first actuator being driven, such that controlling, at least in part, a frequency response as generated by the at least two actuators when the display assembly component is actuated based on the at least one actuation signal while adjusting the activation of the second of the at least two actuators to generate the at least one of haptic feedback and sound by the display assembly component in a region defined by the location of the first actuator.

15. The method as claimed in claim 14, wherein at least one of the at least two actuators comprises a piezoelectric actuator.

16. The method as claimed in claim 14, comprising locating a pad between at least one of the at least two actuators and the display assembly component.

17. The method as claimed in claim 14, further comprising:

associating the sensor and feedback signal with the first of the at least two actuators, such that controlling the at least one of the at least two actuators based on the at least one actuation input and the feedback signal comprises controlling the first of the at least two actuators to compensate for motion of the display assembly component in the region defined by the location of the first actuator caused by motion of the display assembly component by at least one other of the at least two actuators.

18. The method as claimed in claim 15, wherein the at least one sensor comprises a piezoelectric sensor, and wherein the at least one sensor is located between the at least one piezoelectric actuator of the at least two actuators and the display assembly component.

19. The method as claimed in claim 16, wherein the pad is configured to transmit the actuator force to the display assembly component at one of the at least two separate locations.

20. The method as claimed in claim 14, wherein the display assembly component comprises a display panel.

* * * * *